(12) United States Patent
Simantov et al.

(10) Patent No.: US 11,676,185 B2
(45) Date of Patent: Jun. 13, 2023

(54) SYSTEM AND METHODS OF AN EXPENSE MANAGEMENT SYSTEM BASED UPON BUSINESS DOCUMENT ANALYSIS

(71) Applicant: WAY2VAT LTD., Tel-Aviv (IL)

(72) Inventors: Amos Simantov, Hod Hasharon (IL); Roy Shilkrot, Kibbutz Negba (IL); Arnon Yaar, Ramat Hasharon (IL)

(*) Notice: Subject to any disclaimer, the term of this patent is extended or adjusted under 35 U.S.C. 154(b) by 0 days.

(21) Appl. No.: 17/565,500

(22) Filed: Dec. 30, 2021

(65) Prior Publication Data
US 2022/0148054 A1 May 12, 2022

Related U.S. Application Data

(63) Continuation of application No. 15/984,448, filed on May 21, 2018, now abandoned, which is a continuation of application No. 15/544,008, filed as application No. PCT/IB2016/055992 on Oct. 6, 2016, now Pat. No. 10,019,740.

(60) Provisional application No. 62/238,148, filed on Oct. 7, 2015.

(51) Int. Cl.
| | |
|---|---|
| G06Q 30/04 | (2012.01) |
| G06N 20/00 | (2019.01) |
| G06Q 40/12 | (2023.01) |
| G06F 16/93 | (2019.01) |
| G06V 30/413 | (2022.01) |

(52) U.S. Cl.
CPC .............. *G06Q 30/04* (2013.01); *G06F 16/93* (2019.01); *G06N 20/00* (2019.01); *G06Q 40/12* (2013.12); *G06V 30/413* (2022.01)

(58) Field of Classification Search
CPC ........ G06Q 30/04; G06Q 40/12; G06F 16/93; G06N 20/00; G06V 30/413
USPC .......................................................... 705/34
See application file for complete search history.

(56) References Cited

U.S. PATENT DOCUMENTS

| | | | | |
|---|---|---|---|---|
| 9,483,794 | B2* | 11/2016 | Amtrup | G06V 30/40 |
| 11,080,336 | B2* | 8/2021 | Van Dusen | G06F 16/90335 |
| 11,321,772 | B2* | 5/2022 | Amtrup | G06Q 40/03 |
| 2012/0185368 | A1* | 7/2012 | Schloter | G06Q 40/00 |
| | | | | 705/30 |
| 2015/0012399 | A1* | 1/2015 | Ceribelli | G06Q 50/01 |
| | | | | 705/34 |

(Continued)

*Primary Examiner* — Russell S Glass
(74) *Attorney, Agent, or Firm* — Alphapatent Associates, Ltd; Daniel J. Swirsky

(57) ABSTRACT

The disclosure herein relates to business content analysis. In particular, the disclosure relates to systems and methods of an expense management system operable to perform automatic business documents' content analysis for generating business reports associated with automated value added tax (VAT) reclaim, Travel and Expenses (T&E) management, Import/Export management and the like. The system is further operable to provide various organizational expense management aspects for the corporate finance department and the business traveler based upon stored data. Additionally, the system is configured to use a content recognition engine, configured as an enhanced OCR mechanism used for extracting tagged text from invoice images and also provides continuous learning mechanism in a structured mode allowing classification of invoice images by type, providing continual process of improvement and betterment throughout.

6 Claims, 15 Drawing Sheets

(56) References Cited

U.S. PATENT DOCUMENTS

2015/0142643 A1* 5/2015 Ceribelli ............... G06Q 30/04
705/39

* cited by examiner

MAP-MRF Modeling Basics

Sites: $S = \{s_1, ..., s_m\}$

Labels: $L = \{l_1, ..., l_M\}$

Labeling: $f = \{f_1, ..., f_m\}$; $f : S \to L$

Fig. 6

SYSTEM AND METHODS OF AN EXPENSE MANAGEMENT SYSTEM BASED UPON BUSINESS DOCUMENT ANALYSIS

CROSS-REFERENCE TO RELATED APPLICATIONS

This application is a continuation of U.S. patent application Ser. No. 15/984,448, filed May 21, 2018, which is a continuation of U.S. patent application Ser. No. 15/544,008, filed Jul. 16, 2017, and issued as U.S. Pat. No. 10,019,740 on Jul. 10, 2018, which is a U.S. National Phase Application under 35 U.S.C. 371 of International Application No. PCT/IB2016/055992, which has an international filing date of Oct. 6, 2016, and which claims priority and benefit from U.S. Provisional Patent Application No. 62/238,148, filed Oct. 7, 2015, the contents and disclosure of which are incorporated herein by reference in their entirety.

FIELD

The disclosure herein relates to business document analysis. In particular, the disclosure relates to systems and methods of an expense management system operable to perform automatic analysis of the content of business documents for generating business reports associated with automated value added tax (VAT) reclaim, Travel and Expenses (T&E) management, Import/Export management and the like, and further provide various organizational expense management aspects for the corporate finance department and the business traveler based upon stored data.

BACKGROUND

Travel is a significant expense for any company engaged in international business. Employees travelling for business may spend thousands of dollars during their stay in other countries—on hotels, travel, consumed services, exhibitions, tradeshows and the like. Travel management software market and associated expense-management software market, is worth billions of dollars and only 26% of organizations currently use automated systems to manage travel expenses, since the current solutions are too costly or too cumbersome.

For example, value added tax (VAT) can reach up to 25% of credited expenses, can be reclaimed by companies. But current VAT reclaim is still largely a bureaucratic process involving the filing of multiple forms. It gets more complex since employees travel between different countries, causing the finance department to work simultaneously with many VAT agencies in different countries. A 2013 survey by Quocirca Research showed that 59% of businesses incurred foreign travel and entertainment expenses, leaving €20B in unclaimed business refunds annually. One of the major cited difficulties is dealing with foreign taxes.

Systems for invoice analysis or invoice reading have been a research topic for many years, such as Schulz in ICDAR 2009, titled "Seizing the Treasure: Transferring Layout Knowledge in Invoice Analysis", Hamza et al in ICCBR 2007, titled "Case-Based Reasoning for Invoice Analysis and Recognition", Aslan in VISIGRAPH 2016, titled "Use of a graphical part based appearance model (PBM)" and more.

Most modern offices of business entities have to manage on a daily basis a large amount of documents in general, and particularly business documents comprising invoices of goods, services consumed by the business entity and the like. Commonly, invoices are presented as a physical form (paper) requiring a process to transform the invoice into a digital format by scanning or capturing digitally (using a mobile phone, for example). Some invoices are originated in a digital format, yet the associated data needs to be extracted. Thus, these offices are engaged continually with receiving and processing invoices requiring automatic document classification tools aiming at (semi-)automatically classifying the office documents into semantically similar classes.

Invoices usually comprise an invoice layout and may contain a list of charges for the services or products rendered. From a business perspective, invoices require efficient processing for proper financial management of the business entity. Further, value added tax (VAT) management based upon the invoices is crucial for the finance department and for the business traveler.

Business document analysis has been reflected in various patent applications. One such example is described in United States Patent Application No. US 20070168382 A1 titled: "Document analysis for integration of paper records into a searchable electronic database" to Tillberg et al, incorporated herein by reference. The application is associated with electronic extraction of information from fields within documents comprises identifying a document by comparison to a template library, identifying data fields based on size and position, extracting data from the fields, and applying recognition. Another example is described in United States Patent Application No. US 20130318426 A1 titled: "Automated learning of document data fields" to Hervé Shu et al, incorporated herein by reference. The application is associated with digital data configured to obtain a first plurality of data items automatically extracted from a first physical document and a validated value for a data field. The method also includes automatically identifying a first linked data item included in the first plurality of data items that is linked to the validated value and setting a physical position included in a rule to the physical position of the first linked data item.

The need remains therefore, for the automatic generation of invoice associated content analysis reports and VAT management for the business traveler and the finance department, based upon invoice images uploaded onto the content analysis platform.

The invention described herein addresses the above-described needs.

SUMMARY

According to one aspect of the presently disclosed subject matter, there is provided an expense management system operable to perform invoice content analysis, the expense management system comprising: an invoice content analyzer operable to perform automated analysis of at least one digital invoice; an invoice content generator operable to read at least one digital source comprising the at least one digital invoice and further configured to classify at least one tagged text from the at least one digital image into a specific set of fields; and a machine learning engine comprising a knowledge repository, the machine learning engine operable to continuously update the knowledge repository with data pertaining to the at least one image source, wherein the expense management system is operable to produce one or more analysis results, and communicate at least one business report comprising at least one of the results via a communication interface.

In some embodiments, the invoice content generator comprises an optical character recognition (OCR) engine. Further, and where appropriate, the machine learning module is operable to perform online machine learning and batch machine learning.

Variously, the at least one digital source is selected from a group consisting of: an image capturing device, an office scanner, a mobile device camera, a messaging application and combinations thereof. Further, and variously, the at least one digital source is selected from a group consisting of: a computerized expense report, a facsimile page, an e-mail message and combinations thereof.

Where appropriate, the invoice content analyzer is operable to: perform a series of implied transformation procedures on invoice related elements; perform invoice related context analysis; and perform textual analysis. Where appropriate, the invoice content generator operable to convert structured handwritten text of the at least one digital invoice into at least one machine readable string. As appropriate, the invoice content generator is further operable to identify a company logo.

Optionally, the invoice content generator is further operable to execute instructions directed to analyzing the at least one digital invoice with content of at least one language. Optionally, the invoice content generator is further operable to execute instructions directed to analyzing the at least one digital invoice comprising one or more invoice images. Optionally, the invoice content generator is further operable to execute instructions directed to analyzing said at least one digital invoice comprising an invoice image at an orientation. Optionally, the invoice content generator is further operable to execute instructions directed to removing distortions from said one or more invoice images. Optionally, the invoice content analyzer engine further comprises a configurable rules engine operable to determine analysis logic.

According to some embodiments, the expense management system is further operable to perform organizational content analytics, the analytics is statistically based and comprises one or more of the following: behavior spending patterns; expense anomaly identification; suppliers' behavior patterns; employees' behavior patterns; local tax refunds; suppliers' behavior patterns; and travel and expense (T&E) analysis. Additionally, the expense management system further comprising a user interface engine operable to provide visualization and manual control over the system by a user.

Another aspect of the disclosure is to teach a method for performing digital invoice content analysis in an improved manner, said method comprising the steps of: providing an expense management system operable to execute on at least one computing device, the system comprising an invoice content analyzer, an invoice content generator comprising a classifier, a machine learning engine, a communication interface and a tagging mechanism; the method comprising: receiving, via said communication interface, at least one digital source comprising at least one digital invoice; pre-processing, by said invoice content analyzer, said at least one digital invoice; providing, by said tagging mechanism, at least one textual tag associated with a an invoice entity at a location in said at least one digital invoice; analyzing, by said invoice content analyzer, said at least one digital invoice; producing, by said invoice content analyzer, at least one analysis result; generating, by said invoice content analyzer, at least one business report comprising said at least one analysis result; and communicating, by said communication interface, said at least one business report.

As appropriate, the step of receiving further comprises: analyzing, by said invoice content analyzer, quality of the at least one digital invoice; generating, by said invoice content analyzer, at least one quality assessment of said at least one digital invoice; and communicating, by the communication interface, at least one technical response comprising the at least one quality assessment.

As appropriate, the at least one quality assessment is a numeric representation assigned, indicating the technical ability of the expense management system to extract associated information from the at least one digital invoice.

In some embodiments, the invoice content generator further comprises an optical character recognition (OCR) engine, and wherein the step of pre-processing further comprising: generating, by the OCR engine, a textual representation of the at least one digital invoice. In some embodiments, the invoice content analyzer is directing operation of the invoice content generator and the machine learning engine. In some embodiments, the expense management system further comprises a data repository associated with said computing device, and the method further comprises: storing, via the communication interface, the at least one digital invoice and data pertaining to the at least one digital invoice into said data repository.

As appropriate, the data repository is a block of memory associated with said computing device operable as a temporary storing device. Optionally, the expense management system further comprising a knowledge repository, and the method further comprises: updating continuously, by the machine learning engine, data pertaining to the at least one digital invoice into the knowledge repository.

As appropriate, the step of receiving further comprising: pre-processing, by the invoice content analyzer, the at least one digital invoice.

As appropriate, the step of analyzing further comprising: classifying, by the invoice content analyzer, the at least one digital invoice such that the at least one associated tag is mapped into a specific set of fields; and assigning, by the invoice content analyzer, the at least one digital invoice to a pre-determined invoice category.

As appropriate, the step of analyzing further comprising: extracting, by the invoice content analyzer, data pertaining to amount payable and associated currency type; extracting, by the invoice content analyzer, data pertaining to an invoice identification number; extracting, by the invoice content analyzer, data pertaining to date of the at least one digital invoice operable to determine an associated standard date format; extracting, by the invoice content analyzer, data pertaining to business entity name; and extracting, by the invoice content analyzer, data pertaining to business entity identification.

Variously, the machine learning engine is operable to perform learning operations selected from a group consisting of: Online Machine Learning, Batch Learning and combinations thereof.

As appropriate, the step of analyzing further comprising: extracting, by the invoice content analyzer, a probability density function from the at least one associated tag, the probability density function is associable to at least one variable governing the classifier. In some embodiments, the tagging mechanism is operable manually. Alternatively, the tagging mechanism is operable automatically.

As appropriate, the step of generating further comprising: determining report settings, such that the at least one business report is a personal report associated with an employee. As appropriate, the step of generating further comprising:

determining report settings, such that the at least one business report is an organizational report associated with a business unit operations.

Variously, the at least one business report is selected from a group consisting of: a forward financial statement, a special purpose financial statement, a personal financial statement, a value added tax (VAT) summary report, a financial irregularity statement, a tax reclaim statement, a VAT reclaim statement and combinations thereof.

As appropriate, the value added tax (VAT) summary report is created according to regulatory information of a country. As appropriate, the step of pre-processing further comprising: resizing, by the invoice content generator, the at least one digital invoice. As appropriate, the step of pre-processing further comprising: segmenting, by the invoice content generator, the at least one digital invoice to enable processing of the at least one digital invoice as a separate invoice entity. As appropriate, the step of pre-processing further comprising: shaping, by the invoice content generator, the at least one digital invoice to improve image quality associated with binarization, contrast, orientation, filtering and skewing.

As appropriate, the step of pre-processing further comprising: re-orienting, by the invoice content generator, the at least one invoice image.

As appropriate, the step of pre-processing further comprising: de-noising, by the invoice content generator, the at least one invoice image such that image noising is removed and image features are being preserved.

As appropriate, the step of pre-processing further comprising: de-warping, by the invoice content generator, the at least one invoice image such that image readability is being improved and image accuracy is essentially preserved.

As appropriate, the step of classifying further comprising: performing, by the invoice content generator, statistical analysis employing Bayesan Interference configurable to performing classification of the at least one invoice image.

As appropriate, the step of analyzing comprising: retrieving external resources information, the resources are selected from a group consisting of: Mobile GPS, supplier resources, system user history, accounting logic, rules engine, travel meta-data and combinations thereof.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings:

FIG. 6 is a schematic representation of MAP-MRF modeling basics for tagging associated fields of an invoice image;

DETAILED DESCRIPTION

Figure 1:
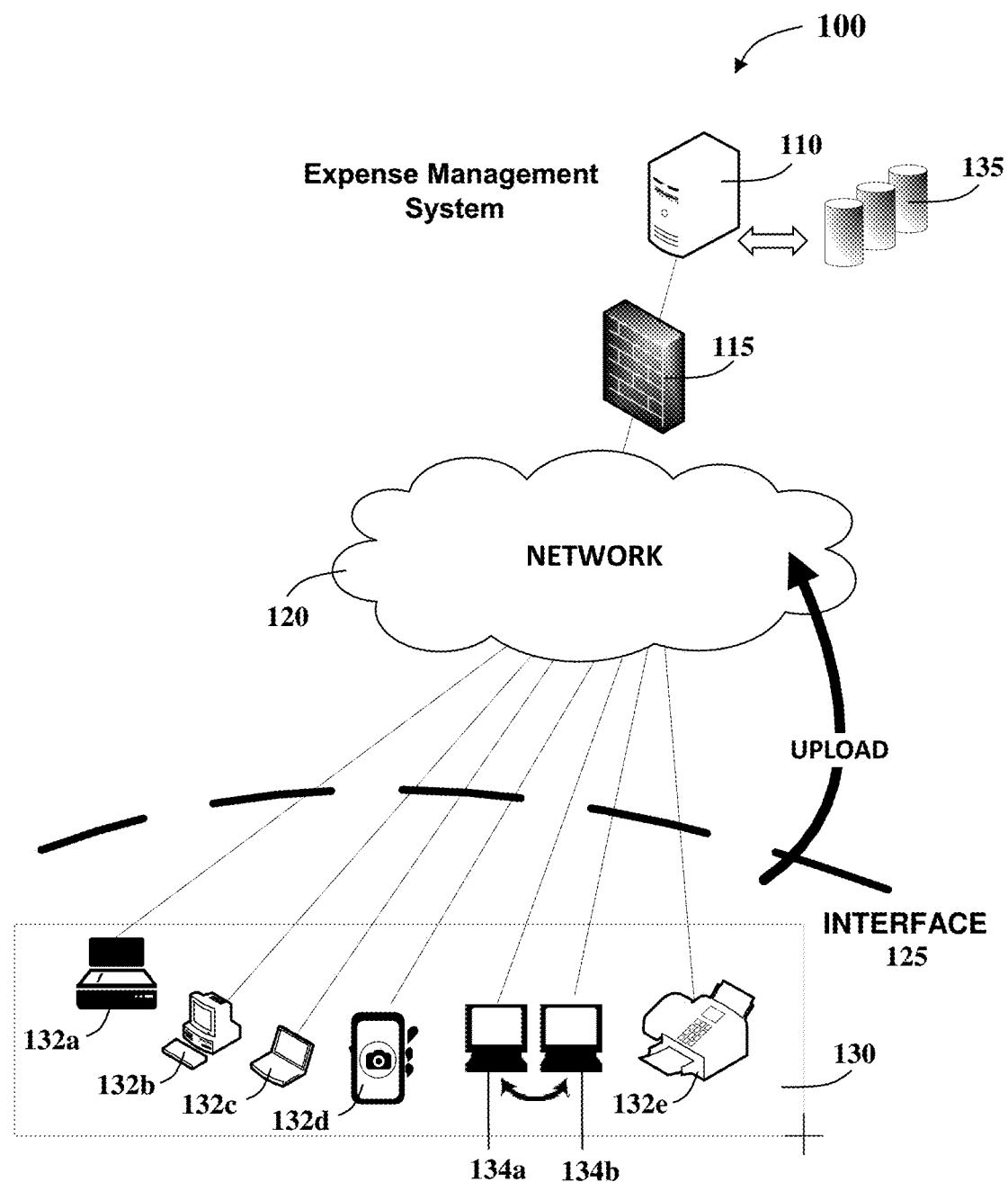
FIG. 1 is a schematic block diagram illustrating the main elements of a digital invoice upload mechanism from a system user to the automated expense management system, according to one embodiment of the current disclosure.

It is noted that the systems and methods of the invention herein, may not be limited in their application to the details of construction and the arrangement of the components or methods set forth in the following description or illustrated in the drawings and examples. The systems and methods of the invention may be capable of other embodiments or of being practiced or carried out in various ways.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Accordingly, various embodiments may omit, substitute, or add various procedures or components as appropriate. For instance, it should be appreciated that the methods may be performed in an order different than described, and that various steps may be added, omitted or combined. Also, aspects and components described with respect to certain embodiments may be combined in various other embodiments. It should also be appreciated that the systems, methods, devices, and software may individually or collectively be components of a larger system, wherein other procedures may take precedence over or otherwise modify their application.

In various embodiments of the disclosure, one or more tasks as described herein, may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data.

Terms & Terminology

As used herein, throughout the specification document and with regard to the current disclosure context, all references associated with an 'invoice' are equally applicable to a 'receipt', 'invoice copies', 'pro-forma invoice' representing business expenses, and the two terms may be used interchangeably.

A digital image, as referred to in this specification, is generally encoded as a matrix of grey level or color values. The need for efficient image repair methods is essential as the digital images of the business documents of all types, often are taken in poor conditions, especially when captured via a mobile device camera. Moreover, no matter how good cameras are, an image improvement is always desirable to extend the range of action or analysis. Image distortion may be obtained in hand-held cameras, scanning speed fluctuations, rotation of the object, scaling, angle of picturing or other cases such as crumpled/wrinkeled/folded invoices, for example. Thus, various image processing technique may need to be applied, such as image re-orientation, de-noising, de-warping, segmentation, de-skewing.

As used herein, image de-noising is an image-processing task configured to remove noise in an image and preserve original image details (signal).

As used herein, image segmentation refers to an image-processing task, dividing a digital image into multiple segments (sets of pixels). The goal of segmentation is to simplify and/or change the representation of an image into meaningful structures, making it easier to analyze.

As used herein, skew refers to the text which is neither parallel nor at right angles to a specified or implied line. During document scanning, skew is inevitably introduced into the incoming document image. Character recognition is very sensitive to skew, therefore skew detection and correction (de-skew) in document images are critical steps before layout analysis.

It is noted that text in the images delivered by digital cameras often gets strongly distorted, and the images cannot be used for further processing using standard image processing techniques. Sources of distortion may originate from the optical elements or sensor of the imager, angle and distance of imaging, motion or hand tremor, crumples in the original document, or errors in network when broadcasting the image data.

As used herein, image de-warping refers to removing geometrical distortion and can therefore be used to enhance picture quality, helping to improve all subsequent processing steps. In particular, content recognition yields much better results on undistorted images.

As used herein binarization refers to the process of converting a pixel image to a binary image, in which the image has multiple gray levels, for example some power of 2 such as 256 gray levels, and the conversion is into a 2-level (black and white) image. Commonly, binarization is used as a pre-processor before content recognition. The simplest way to use image binarization is to choose a threshold value, and classify all pixels with values above this threshold as white, and all other pixels as black. The problem then is how to select the correct threshold. In many cases, finding one threshold compatible to the entire image is very difficult, and in many cases even impossible. Therefore, adaptive image binarization is needed where an optimal threshold is chosen for each image area.

As used herein Invoice Content Generator and Content Recognition Engine refer to a mechanism providing software functionality of reading and interpreting a dedicated business document (such as an invoice). The mechanism may further help to analyze business effectiveness in business related matters such as general expense management, VAT reclaim, Travel & Expenses (T&E), Import/Export and the like.

General Aspects

Aspects of the present disclosure relate to system and methods for providing automatic expense management and answer business needs of an organization by managing business documents associated with travelling and may provide advanced services to the business traveler and the corporate finance department. Specifically, the automatic expense management is configured to reduce the complicated, tedious, and highly bureaucratic value added tax (VAT) reclaim process into a simple seamless one that will increase a company's bottom line, replacing existing labor-intensive bureaucratic processes. The system may provide for transparent reporting, as expenses are reported exactly as they occur, for increased transparency and better control over company expenses and reduce revenue lost as VAT refunds are observed automatically. Additionally, paper work is minimized as all information is reported by business travelers in real time with an easy to use software application, so no information about expenses is lost.

The expense management system is configured as a machine aided management system for business documents (such as invoices/receipts) content analysis to enable VAT reclaim requests, travel expense management, Import/Export management may benefit the corporate finance department as well as for a business traveler visiting various countries on a business tour. Additionally, the system provides the business traveler with the ability to manage and control associated business expenses and direct communication with the organizational financial department.

The current disclosure refers to an automated system operable in an ever-improving manner, based upon an invoice content analyzer and a machine learning mechanism capable of handling large quantities of invoice images, which continuously update the system's knowledge repository thus improving its efficiency. The system may generate reports and forms automatically, such as expense reports according to a set of scanned invoice images of the business traveler.

For illustrative purposes only, various embodiments of the system are outlined below, comprising an invoice content analyzer mechanism to enable invoice image processing to determine the associated context and the relevant text.

The processing may include analysis of the various invoice image fields, determining the associated field text context at various levels, such as:

(a) Extracting amount payable, type of currency such as US Dollar, Euro, Pound Sterling (GBP), Japan Yen (JPY) and the like;

(b) Extracting the invoice identification number;

(c) Extracting date, in various standard formats; and (d) Extracting business entity name, business identification number (in Israel), Employer Identification Number (EIN), also known as a Federal Business Tax Identification Number (in the U.S.), a VAT number and business identity code in Europe and the like.

Where appropriate, the analysis may determine the type of the expense using associated context. For example, determining that the logo in the invoice header is associated with AVIS or any text in the invoice mentions the words "mileage" or "driver", may indicate that the context of the processed image may be associated with "travel expenses/car rental". Additionally, implied expenses type such as transportation, car rental and the like may be automatically identified, even when not specifically stated in the invoice. The implied expense type may be based on expense types that are uniquely associated with the service provider. For example, the logo of AVIS may indicate that the implied expense type may be associated with "travel expenses/car rental".

The system is operable to allow the traveler to scan travel invoices using a mobile device camera, for example, and receive comprehensive travel reports at the end of the business trip. Technically, the expense management system may be operable, for example, to receive digital invoices online, perform implied analysis using machine learning and invoice classification, extract specific expense data and to generate expense report and expense management functionality for the business traveler and the corporate finance department. Additionally or alternatively, the system may be operable to provide immediate feedback as to the quality of the received image and associated data, and allow for manual error correction.

The automatic expense management system is operable to determine key invoice information extracted from a digital invoice such as purchase order number, service provider identification number, invoice date, service provider name, invoice number, VAT number, VAT value, amount payable and the like. The system may do so from a document comprising a single or multi-page digital invoices, from different service providers spread across countries and written in multiple languages.

It is noted that the system may employ an automated image cleanup, a character recognition technology with built-in recognition logic to capture invoice data with high accuracy and is further configured to dynamically locate data of an invoice.

The Expense Management System may provide the corporate finance department with various financing tools to allow more transparent reporting and better control over business matters such as organizational travel expenses, if possible. More importantly, the system may help companies reclaim all potential VAT expenses smoothly and automatically. The system easily processes foreign and local VAT reclaims once expenses are recorded and classified. Additionally, the system software may be readily integrated into all back-office systems, saving organizational resources.

Furthermore, the system may provide the business traveler easy functionality to manage business travel expenses and VAT/Tax reclaims. Thus, a business traveler may capture images of invoice/receipts during a business travel using a mobile device, and using an application (operable to use advanced character recognition and GPS technology) may interpret the contents of the captured invoice images and store the information on the cloud, via the application. Upon returning, the business traveler may generate a detailed travel expense report instantly, claim reimbursement immediately for incurred expenses. Additional features may enable users to create travel itineraries, deal with organizational travel approval process, book or change flights and hotels, and the like.

As described hereinafter in this document, the technology required for the automated content analysis of digital invoices, and further associated with construction-related automated analysis for tax reclaim reports is based on scanning of the digital invoices. Thus, the expense management system is capable of recognizing invoice line items or tabular data from the captured invoice images (scanning, photographing) retrieved from a single or a multi-page invoice document. Further, with the extracted line-item information, incoming invoices may automatically be matched with the correct service provider (for example, by identifying its logo) and purchase contract to ensure a more efficient purchase payment with associated VAT amount. The system may further be operable to generate a set of visual indications or highlights on the associated invoice document. Where appropriate, the system may indicate extracted data with precision rate, such that a human controller or an operator may concentrate immediately on important tasks, as needed. Additionally or alternatively, the system may be operable to receive supportive data and visual indications on top of the invoice document such that human discovered resolutions may feed automatically the recognition and machine learning engines. For example, "this is the total field (and xxx is its amount). It is cross referenced with that field. Both located at this area of the page."

Where appropriate, the system is capable to automatically identify invoices coming from different service providers. This may be performed using the machine learning mechanism of the system, associated with a knowledge repository. The knowledge repository may include various data fields, pertaining data associated with a service provider including service provider name, service provider ID, registration number, VAT number, location and addresses and the like.

Where appropriate, the system is operable to extract information from other internal and external sources, to improve its efficiency and gain high recognition rate of invoices and to enable processing large invoice volumes.

Reference is now made to FIG. 1, there is provided a general schematic block diagram representing an upload mechanism, which is generally indicated at 100, for uploading digital invoices, by a system user (business traveler, for example) onto the data repository of the automated expense management system, according to one embodiment of the current disclosure. The upload mechanism 100 consists of an electrical device 130 operable to create a digital expense document/capturing an invoice image may further use an application interface 125 enabling communication with an expense management system 110 via a communication network 120 such as the internet. The expense management system is operable to receive the transmitted digital media (a digital document/captured invoice image and the like), perform initial quality assessment analysis, provide immediate feedback (as described in FIG. 2, hereinafter) and store the digital document and associated data in a data repository 135.

The system business user may use an electrical device 130 comprising various digital cameras or more commonly use the camera of his/her communication device such as smartphone, tablet and the like. Specifically, the electrical device may be selected from a group consisting of an office scanner 132*a*, a digital machine such as a personal computer 132*b* or a laptop computer 132*c*, a smartphone 132*d* (or a tablet) and a facsimile machine 132*e*. Additionally, invoices may undergo digital processing between two computers 134*a* and 134*b*, such as an airline ticket office sending an invoice to one's computer. The upload interface 125 may be a software application, a dedicated web site and the like.

It is noted that the various electrical devices 130 may be operable to communicate a digital document such as messages, e-mails and the like comprising data pertaining to an invoice.

It is further noted that captured invoice images may be compressed to allow for better communication and ease of uploading.

Optionally, the computing server hosting the expense management system is protected by a firewall 115.

Figure 2:
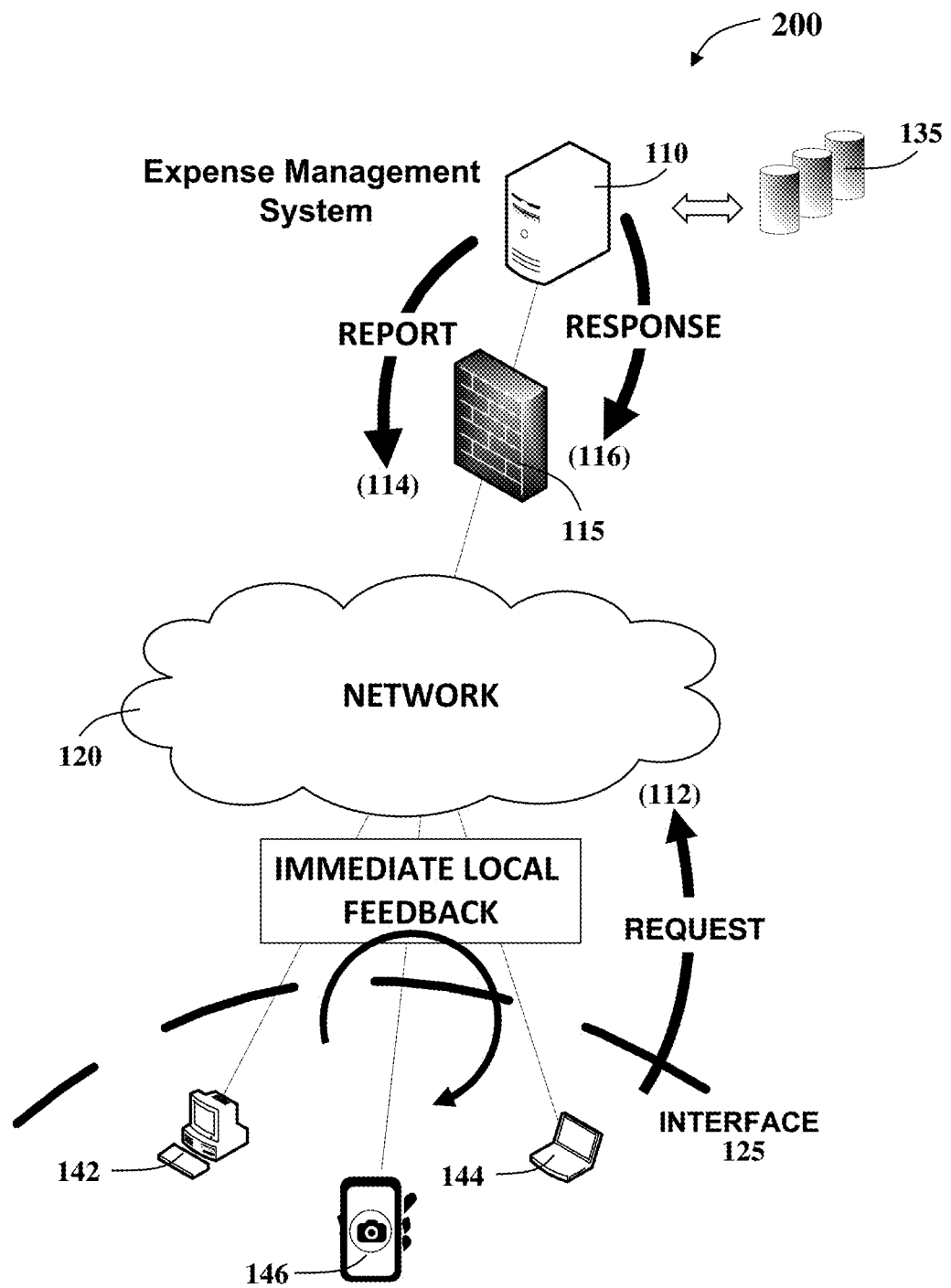
FIG. 2 is a schematic block diagram illustrating a possible request/response mechanism of the automated expense management system while processing digital invoices, according to one embodiment of the current disclosure.

Reference is now made to FIG. 2, there is provided a general schematic block diagram representing a request/response mechanism, which is generally indicated at 200, while processing digital invoices, by a system business user communicating with the automated expense management system, according to one embodiment of the current disclosure. The request/response mechanism 200 consists of an electrical device, represented a personal computer 142, a laptop computer 144 and a smartphone 146 operable to create a digital expense document/capturing an invoice image, use an application interface 125 to communicate with an expense management system 110 via a communication network 120 such as the internet. The request communication 112 of the system business user may be performed in different phases of engagement with the expense management system, such as uploading digital documents comprising travel invoices and associated data onto system's data repository 135, analyzing a specific set of digital invoices associated with a business activity, requesting a summary report of reclaimed VAT, travel expenses and the like. The system may be operable to provide immediate response, associated with the received invoice image quality assessment. Optionally, the immediate response may include additional confirmation information.

The system business user's request 112 may communicate with the system by uploading of digital documents (via the application interface 125), triggering, based upon system configuration, basic quality assessment of the uploaded documents. The system user's request 112 may initiate a specific request (via the application interface 125) to perform analysis or request a report. Thus, the response may be transmitting a report 114 or transmitting a short feedback message 116 indicating the initial quality assessment of the digital document.

For example, the cycle of response associated with quality assessment may be generated based upon a simplified algorithmic analysis of the character recognition mechanism during upload, performing partial analysis of specific parameters enabling an immediate response. Additionally or alternatively, the cycle of response associated with quality assessment may be generated upon the invoice content analyzer, while performing full scope analysis of a set of business documents, generating at least one quality assessment for at least one digital invoice and communicating, via system's communication interface, at least one technical response comprising the quality assessment response.

It is noted that initial quality assessment may be generated based upon a simplified algorithmic analysis of the character recognition mechanism to support an initial short cycle of a response. Alternatively, the initial quality assessment may perform partial analysis of specific parameters to enable an immediate response.

It is further noted that the system business user may be a business traveler, a representative of the corporate finance department, system's administrator/operator, a third-party authorized person and the like.

Figure 3:
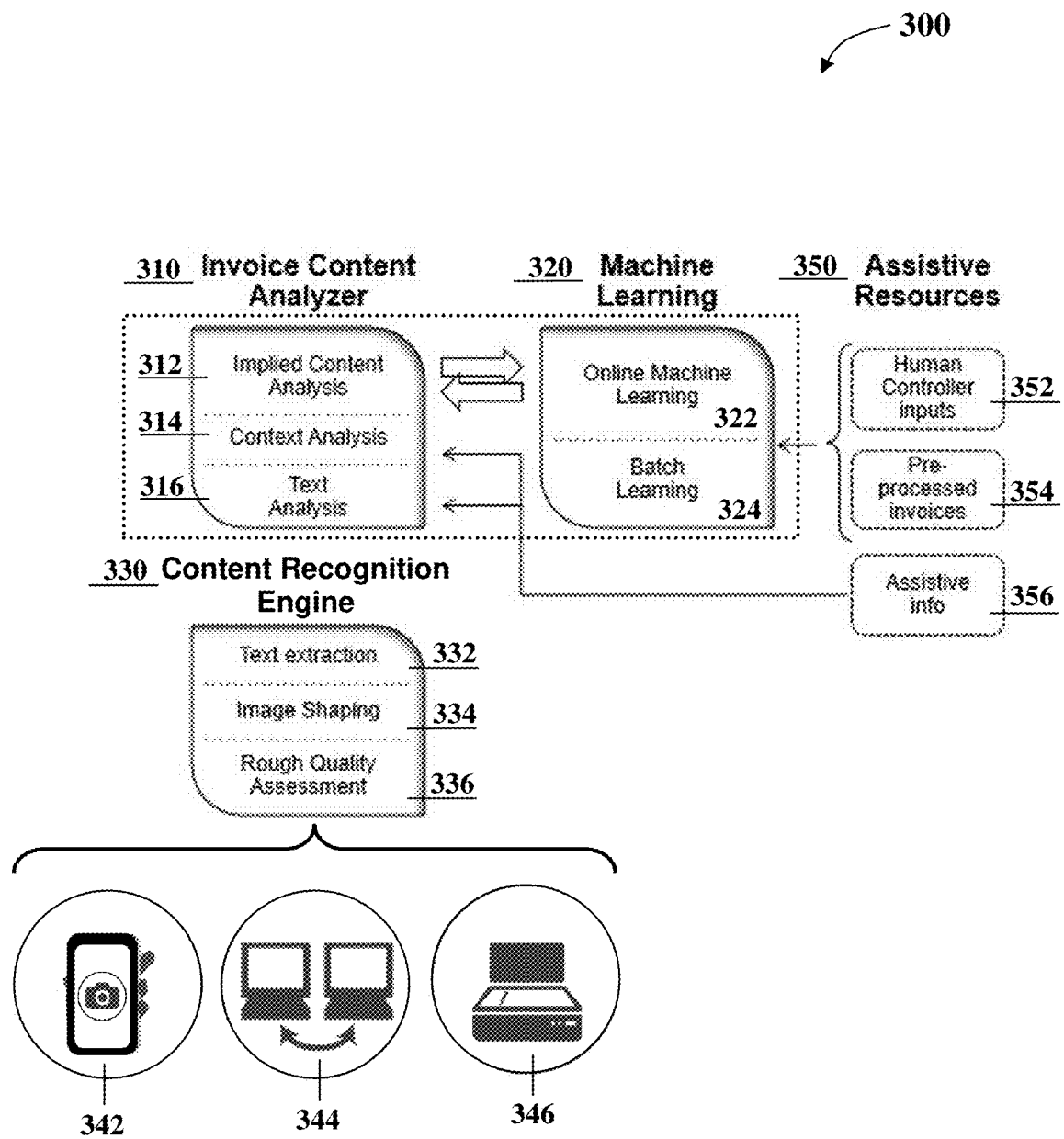
FIG. 3 is a schematic block diagram illustrating the main elements of the automated expense management system for performing content analysis for digital business documentations comprising invoices, according to one embodiment of the current disclosure.

Reference is now made to FIG. 3, there is provided the main elements of the automated expense management system, which is generally indicated at 300, for performing content analysis for digital business documentations comprising invoices, according to one embodiment of the current disclosure. The automated expense management system 300 consists of an invoice content analyzer 310, a machine learning engine 320, an optical content recognition engine 330 and further operable to communicate with assistive resources 350.

The invoice content analyzer 310 includes an implied content analysis component 312, a context analysis component 314 and a text analysis component 316. The implied content analysis component 312 may identify a company logo, say AVIS, which may imply that the currently analyzed invoice is associated with expense type of "Transportation/Car Rental". The context analysis component 314 may refer to various aspects associated with the content analysis, such as field classification and relative relations between fields, may be performed in the context of the image and further in relation to the text context. The text analysis component 316 may rely on additional information, if available, from various sources such as travel destination, date, invoice scanning location and the like. The scanning may refer to text content, location in the scanned document, etc.

The machine learning engine 320 includes an online machine learning component 322 and a batch learning component 324. The machine learning engine 320 is operable to continually learn the associated tagged repository (see knowledge repository 445, FIG. 4) comprising a large set of invoice images. The repository comprising tags attached to specific locations of an invoice image and associated text and in parallel to data that is designed for extraction. Where appropriate, tags may be associated with various fields of the invoice such as the type of expense creating the need, its cost break down, VAT paid, language, currency and the like. Accordingly, each associated tag may enable a density function to be extracted for the variables of the classification sub-system. Additionally or alternatively, the tags may be used as features for standard machine learning mechanisms to perform the classification, such as boosting, SVM, decision trees, artificial neural networks and the like, depending on the specific problem and its characteristics (see paragraphs, hereinafter).

Where appropriate, the expense management system may use data that is not part of the invoice image, rather is accessible to the Expense Management System via the electrical device such as GPS, time and hours of the day, country location (to enable determining language, currency, local rules and more), customer identity and more.

The content recognition engine 330 operable to receive a digital invoice image such as a scanned document or a captured image of a document, from electrical devices such as a mobile device 342, computerized systems 344, office scanners 346 and the like. The content recognition engine 330 is further configured to convert the digital invoice images into machine-encoded text. The content recognition engine 330 includes a text extraction component 332, an image shaping component 334 operable to perform contrast enhancement, binarization, reorientation, filtering, de-warping, segmentation and de-skewing; and a rough quality assessment component 336 operable for immediate feedback, as described herein above (FIG. 1 and FIG. 2).

It is noted that the content recognition engine is a mechanism known in the art and in general, an analogous optical character recognition (OCR) may be used for digitization of a picture into text. The current disclosure usage of the content recognition engine, as part of the implied content analysis (of the invoice content analyzer 310) provides a unique method. The disclosed method is based upon using the content recognition engine for the purpose of generating automatic classification of the various invoices associated fields (business name and ID, currency, language, totals and the like), enabling increased efficiency and management of a large amount of invoice analysis. The disclosed method as presented in this specification document uses an enhanced content recognition engine based on existing probabilistic methods, mostly frequency based and statistical deduction methods, using "Bayesan Inference" specifically tailored to enable machine learning and supporting the classification process.

Where appropriate, the invoice content analyzer is operable to read information from various internal and external assistive information resources 350 and further operable to perform automatic business documents (such as invoices) processing, irrespective of the business document layout. The assistive resources 350 may implement may serve as system input to the machine learning module 320, operable to communicate with external sources such as receiving human controller inputs 352; and receiving pre-processes invoices 354. Where appropriate, the invoice content analyzer is operable to read information from various internal and external information sources and perform automatic invoice processing irrespective of invoice layout. The analyzer uses a powerful recognition engine 330 coupled with a content analyzer capable to identify any service provider along with content/context analysis and recognition.

The systems' inputs may be:

(a) A computerized business system associated with the workers, combined with scanned invoices as may be obtained from an external travel management, system, if exist for the organization;

(b) Scanned business documents, such as invoices, receipts, import/export documents and the like;

(c) Business documents captured by an electrical device such as a digital camera, smartphone camera, flatbed scanner and the like;

(d) Only original invoice ("a pile of papers"); and (e) Assistive information 356, such as input to the context analysis component 314 and text analysis component 316. The assistive information 356 may include location parameters via a mobile GPS mechanism, additional organization related information for other systems, personal assistive information optionally related to employees, time and date, business travel planning, organization planning and the like.

It is noted that the system is operable to determine and analyze a scanned or a visualized document with multiple invoices, such as may be the case when using a scanner or taking pictures using a smartphone camera.

The Content Recognition Engine

The content recognition engine, configured as a document analysis mechanism, may be used for extracting semantically annotated text from invoice images. Invoice images may be received as described in FIGS. 1-2, commonly received by the expense management system as a scanned image, a snapshot image captured by a smartphone camera and the like. Further, the content recognition engine is operable to extract figures and letter and generate the associated 'words' and 'numbers'. The content recognition engine is not "aware" of the associated context of the document (an invoice/receipt); rather this is performed by the logic elements of the expense management system. Accordingly, the enhancement may be associated with advanced functionalities:

(a) Multiple invoices per one image—if an image is analyzed to contain multiple invoices, the image may undergo segmentation to regions and separation into singular processing units. The expense management system may first remove local areas in the invoice image where text appears. Additionally or alternatively, the regions may be consolidated according to possible features such as orientation and closeness, text profile (the same printer may print text similarly and different from other printers), spot special edges of the image (may be realized by probabilistic graphical methods such as Markov random fields). Optionally, the image may be exported onto a separate image type for further processing.

(b) Shaping mechanism of image quality—The mechanism is operable to handle low image quality, especially for the case when an image has been captured by a mobile device camera (such as smartphone), at outdoor areas, under limiting conditions. Low quality images may appear due to misunderstanding of system requirements for scanning and text recognition related issues.

(c) Hand-writing recognition (d) Text extraction and associated location. For example, the Logo of a service provider.

The Invoice Content Analyzer

The invoice content analyzer 310 is operable to perform analysis in a dual mode, combining automatic mode and manual mode at changing degrees according to accumulated knowledge of the machine learning engine 330. The invoice content analyzer 310 is operable to perform:

(a) Text analysis, which may rely on additional information, if available, from various sources such as travel destination, date, invoice scanning location and the like. The scanning may refer to text content, location in the scanned document, etc.

It is noted that the analyzer 310 may use the results of the content recognition engine 320 and further improve the quality of the image/text, by using additional information from internal or external sources 356.

(b) Context analysis, which may refer to various aspects associated with the content. Field classification and relative relations between fields may be performed in the context of the image and further in relation to the text context. Image wise, an invoice record aligned horizontally at the same level and right justified (item name), left justified (price), if the language is RTL (Right to Left), and inversely if the language is LTR (Left to Right). Text wise, invoice records commonly include the item name and associated price. Optionally, additional data fields may exist. Accordingly, various probabilities may be calculated and assigned over the prevalence of letters and numbers, as may be determined according to definitions of the learning repository, thus classify each field by its type.

Additionally, the content recognition engine may process the content recognition engine output to further modify and improve the output based on the text, context analysis, and existing machine learning engine knowledge. For example, the string: "TØT4L" ('T', 'Zero', 'T', 'Four', 'L') as found by the content recognition engine, may be parsed as "TOTAL". Further, fields that are expected to contain amounts may be shaped accordingly, such that 'o' considered as a zero, a dot may require to be converted into a comma and the like (for example, 1.o00→1,000).

Optionally, the location of numbers and digits in the invoice may provide indications to the amount payable. Further, general positioning information of the received invoice image or relative position with respect to other fields in the invoice image may be used for the classification mechanism, where the probabilities may be learned empirically, via the machine learning mechanism.

Optionally, fields may be associated with classes by analyzing their syntax. For example, the word 'amount' and 'total' may be related to the final payment value. The field content may serve as an explicit parameter to determine field classification. Thus, a repository of words may be used an NLP (Natural Language Processing) mechanism in the process of classification to extract information from sentences, using the various associated tags and guide the learning field in a probabilistic classification method. Additionally or alternatively, probabilistic context free grammars (PCFGs) may be applied to a document to enhance layout analysis.

Optionally, the system is configured to add past history record associated with the employer/employee/provider, thus improving the analysis process.

Optionally, the system is operable to analyze context in various aspects such as the invoice print time (morning hours may indicate high probability of breakfast association), geographical location, language and the like.

Optionally, the system is operable to extract the type of expense that is not textually represented in the business document. For example, identification of the AVIS logo at the top of the page will indicate with high probability of an expense set associated with car rental and accordingly may contribute in understanding other fields of the invoice.

The Computational Learning Mechanism

The content analysis engine, in particular the context analysis component requires continual process of improvement and betterment throughout.

It is likely that over time, the diversity of received invoice images will increase with varying ways of presenting data. Additionally, only partial information may be available. Thus, the necessary logic to enable correct extraction of the data fields and associated information requires continuous structuring and adjustment to reach an efficient process.

The tagged information generated by the management system may be added continuously to the knowledge repository, based upon quality assurance steps. Additionally or alternatively, at specific time intervals a learning process may be triggered to update the classifier and the probabilistic models, or by methods of Online Machine Learning.

Where appropriate, manual self-structuring may be examined automatically based upon manually tagged information to determine the data field required to be extracted from the invoice images. Accordingly, the system supports an easy to use user interface to perform the analysis rapidly and efficiently. In particular, the continuous learning of the system enables resolving of complex invoice images.

Learning Mechanism

The content analysis platform supports a continuous learning mechanism in a structured mode and further allows classification of invoice images by type. The system classification is based on similarity/identification (partial) of past invoices associated with the employee in previous business travels. Additionally or alternatively, the system uses the classification mechanism to classify business travels invoices associated with the business entity and other employees.

It is particularly noted that the continuous learning mechanism structured mode, supports a dual mode of automatic analysis coupled with manual updates. The automatic analysis mode is based upon a knowledge repository continuously accumulating further knowledge that may be applied to new invoice images uploaded. The manual mode is combined with the automatic mode and is performed as a complementary mechanism in order to improve the automatic analysis mode. The machine learning mechanism has a unique advantage of keeping the dual mode (automatic/manual) at changing levels. For example, during the initial phase of operation the manual processing analysis is dominant and requesting more human intervention and inputs. With the growth of betterment of the knowledge repository, the automatic mode becomes more significant, requiring minimal manual input and corrections. Thus, the machine learning process may depend on human input in a decreasing manner based upon data collection and efficiency lead by appropriate classification.

Human intervention may be required in cases of reduced clarity, such as low textual identification and analysis, low accuracy of data extraction from specific field such as "totals", "currency" and more, exceptions of amount payable of extremely high value, for example, and the like.

It is particularly noted that the invoice content analyzer is aimed at handling very high volume of invoices for analysis. Thus, the learning mechanism is a crucial component directed to increase the efficiency of the invoice content analyzer. The learning mechanism is based upon an invoice content generator operable to perform content recognition to enable converting a business document (a scanned invoice, an invoice image captured by a camera) into an editable and searchable format, such that a final financial report may be obtained efficiently. Human intervention may be necessary, as described hereinabove, to reach a robust and solid platform and output a desired value function.

Optionally, the invoice content generator comprises an optical character recognition (OCR) engine.

Onsite Barcode Mechanism

The expense management system is further operable to enable collecting and depositing hardcopy invoices via the system's collection tool. The current system provides an uploading business documents mechanism of digitally scanned/captured images such as invoices, receipts and the like. Additionally or alternatively a third mechanism is operable using digital envelopes associated with a barcode of 8 digits, for example.

Where appropriate, the expense management system is operable to provide a set of digital envelops, to enable the business traveler to gather all associated paper work invoices into digital envelopes that are barcode enabled. For example, prior to setting off to a destination, the ERP organizational system may provide an envelope barcode, thus binding the future envelop content to a specific travel agenda of a business traveler.

Commonly, the invoice content may be captured by a smartphone camera or scanned with in-house scanner. Additionally, an invoice may be received by a digital interaction (a ticketing office computer and traveler's laptop, for example). As appropriate, the scanned/captured image may be upload onto the central repository of the expense management system. Alternatively, the digital envelop (already associated with the business traveler and its destination, may be placed onto a smart stand of the expense management system placed variously, in different geographical locations. Each envelope reaching such a smart stand may undergo a local scanning, and uploading based upon the user barcode parameter.

It is noted that the envelope invoice may be scanned locally and uploaded accordingly using the barcode identification. Alternatively, the business traveler may use scanning facilities provided by the expense management system, part of its hand-held devices or the user may use an alternative scanner of a potential customer.

Figure 4:
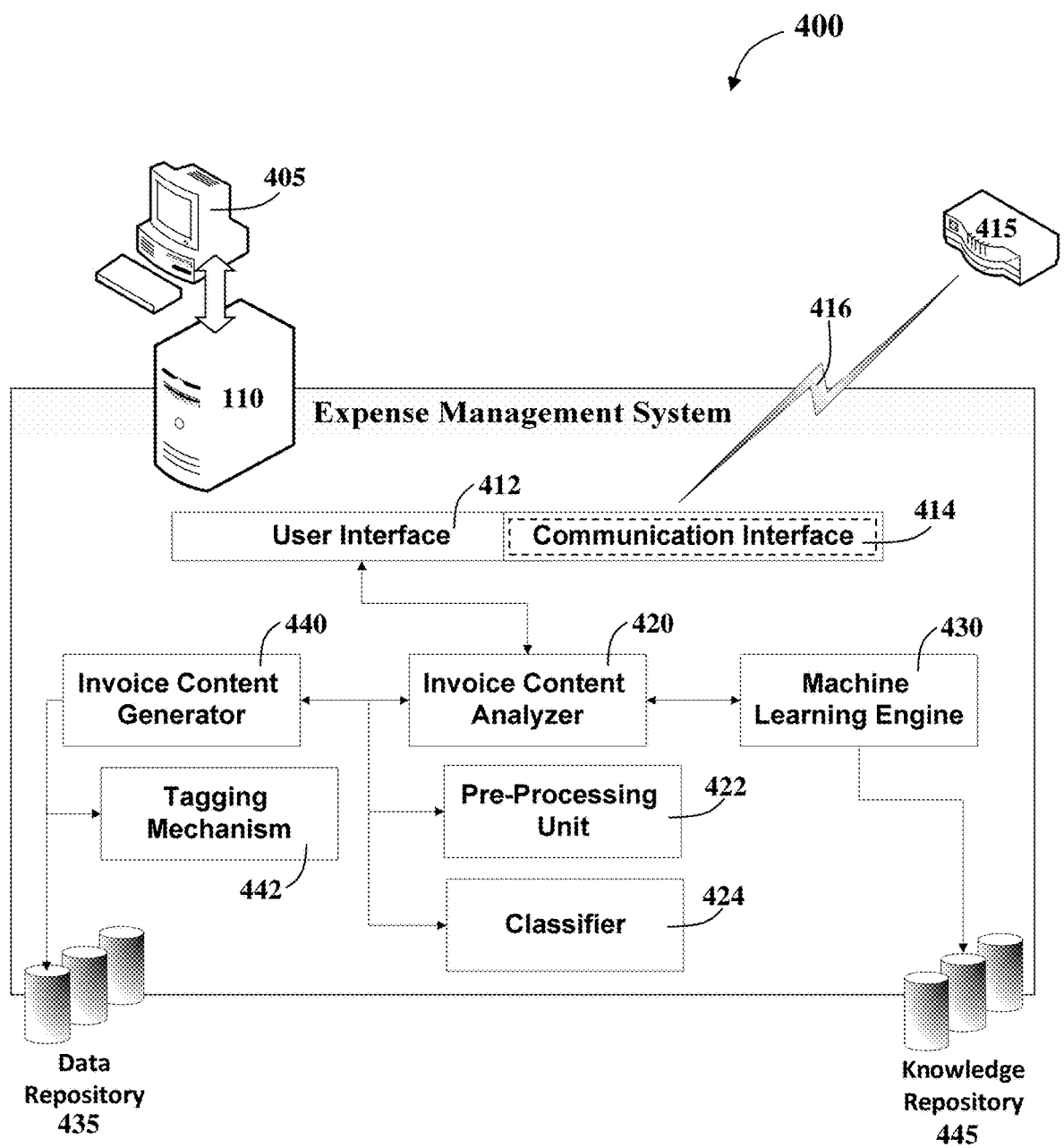
FIG. 4 is a schematic block diagram illustrating the main elements of the automated expense management system for performing content analysis of digital business documents and for automatically managing business related aspects of expenses, according to another embodiment of the current disclosure.

Reference is now made to FIG. 4, there is provided the main elements of the automated expense management system, which is generally indicated at 400, for performing content analysis of digital business documents and for automatically managing business related aspects of expenses, according to another embodiment of the current disclosure. The automated expense management system 400 consists of an invoice content analyzer 420 comprising to a pre-processing unit 422 and a classifier 424, a machine learning engine 430 connectable to a knowledge repository 445 and an invoice content generator 440 connectable to a data repository 435, the generator further comprising a tagging mechanism 442. The invoice content analyzer 420 is directed to control the system components and further operable to communicate externally via a user interface 412 comprising a communication interface 414 to enable connectivity via a communication channel 416 with a gateway 415, for example.

Optionally, the data repository may be connected and controlled directly by the invoice content analyzer 420, based upon system's architecture.

User Interface

The content analysis platform for invoices may be configured to use machine learning algorithms to improve its efficiency and to enable handling of high volume of invoice processing, as may be required for large organizations. The machine learning mechanism may require human intervention at a decreasing rate, while enabling control and sampling. The system performs textual and cognitive analysis to an invoice, adding the associated classification. Accordingly, for the next invoice with the same classification the accumulated information may be used, thus decreasing significantly the processing time.

This system may provide the capabilities:

(a) Presenting the scanned document, marking the extracted fields and display associated extracted information (such as labels, meta-data, field relationship and the like);

(b) The presented information may be editable/approved and operable to display erroneous fields/regions/text;

(c) Move various elements, moving indications for corrections purposes (such as the total of the invoice associated with another field, the logo is associated with another business entity and the like); and (d) Indicate the level of uncertainty associated to various details/fields.

Additional Functions

The content analysis platform for invoices may further support various functions, such as the following:

(a) Support analysis performed in various languages;

(b) Processing multiple invoices on a single scanned document;

(c) Support various possible orientations for a scanned invoice in a document; additionally, support various orientations of multiple invoices in a single document, where each invoice may be oriented differently; and (d) Content invoice analysis may be applied to printed invoices. Optionally, handwriting recognition may be added at various levels according to technological advances in the field.

Additional Information

The invoice content analyzer for invoices may use information from various sources, as may be available in various locations. Examples include:

(a) GPS information associated with the location where the invoice is scanned, may provide relevant information associated to the invoice such as associated language of the invoice, associated currency and the like. For example, if an invoice is scanned in the United Kingdom (London, for example, by GPS location), it may be assumed that the language is English and the currency is Pound Sterling, thus the symbol of '£' may be searched for, in the scanned invoice;

(b) Information associated with the travel destination may be available via external systems, may provide similar information associated with language, currency, type of business and the like; and (c) Information about the time and dates of the journey of the business traveler may be obtained manually or automatically from external systems (such as airline ticketing office, hotel reservations and the like).

It is noted that once the location is known (GPS information), additional information may be deducted such as currency of the country, currency terminology for the country, value added tax, terms used (VAT vs. TVA, for example)

Figure 5:
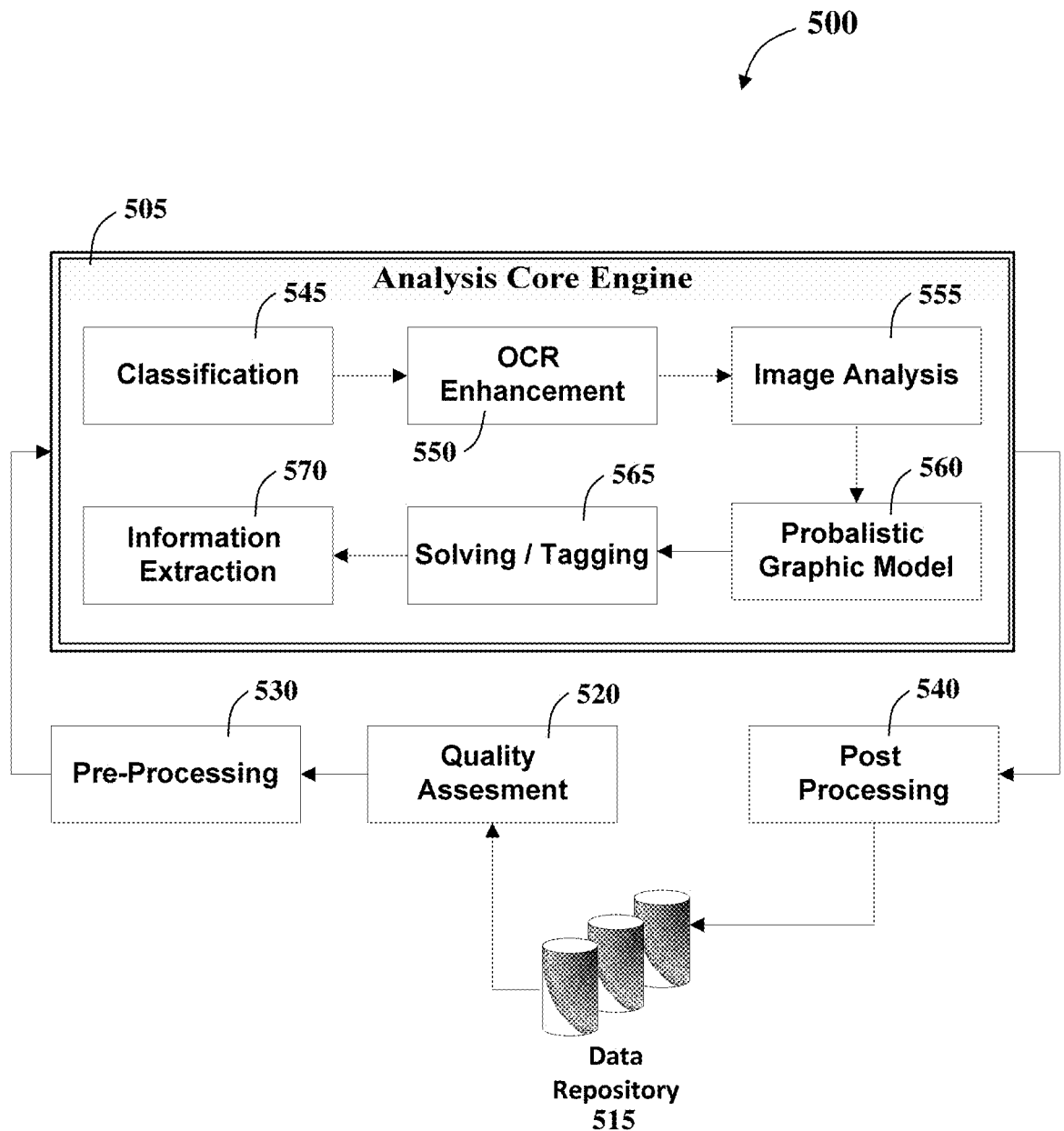
FIG. 5 is a schematic block diagram illustrating a modular architecture of the automated expense management system, according to yet another embodiment of the current disclosure.

Reference is now made to FIG. 5, there is provided a modular architecture of the automated expense management system, which is generally indicated at 500, for performing content analysis of digital business documentations and for automatically managing business related aspects of expenses, according to yet another embodiment of the current disclosure. The automated expense management system 500 consists of an analysis core engine 505 comprising a classification module 545 operable to classify the business document (digital invoice content, for example) into a limited number of major classes as described hereinafter; OCR enhancement module 550 operable to provide enhanced functionality to overcome OCR engine limitations, image analysis module 555, probabilistic graphic model (PGM) module 560 operable to provide a graphic model for the image analysis, solving/tagging module 565 operable to add tags where applicable and information extraction module 570.

The automated expense management system 500 further comprises a data repository 515, a quality assessment module 520 operable to provide quality indicator of the invoice image, and a pre-processing module 530 communicating with the analysis core engine 505 operable to produce a "clean" copy of noisy scanning or image capturing, using domain knowledge. The analysis core engine 505 is operable to provide at least one analysis result associated with a business document that may enter into a post-processing module 540 prior to storing the information into the data repository 515.

The PGM have been used for invoice analysis in prior art. Yet the approach of the current disclosure uses PGM for invoice analysis in an unusual manner, uniquely the novel approach focuses on Semi-Regular Markov Random Field (MRF) operable as a tagging mechanism. The MRF, within the context of the current disclosure is configured to tag "sites" with meaningful labels such as "TOTAL", "SUM", "VAT", "ITEM" and the like (as exemplified in FIG. 6). The system solves a global probabilistic graphical model in the Maximum a posteriori (MAP)-MRF framework designed to overcome shortcomings of existing methods.

It is noted that the (MAP)-MRF framework basic assumption is that the business document (such as an invoice image) includes structured content with spatial inter-relations between the various elements (fields) that can be discovered and exploited. Further, contextual information is available and human tagging may be also available.

Optionally, the (MAP)-MRF framework is preceded by a tagging framework reliant upon the 'geometric signature' of each label, defined as the set of distances between the location of the label and the locations of other labels. The system can be employed to tag "sites" with meaningful labels such that the deviations of the 'geometric signatures' of the tagged labels from 'signature' statistics derived from previously tagged data is minimal.

Existing OCR technology lacks various functionalities mainly due to the complex required analysis and the large amount of noise that needs to be cleared. The current expense management system provides OCR enhanced functionality supporting the main failure points of OCRs as currently known. The enhancements include, variously: Breaking words apart, combining words together; Character miss-classification; False positives (things that are not characters); and False negatives (missing characters).

Fully convolutional networks (FCN) are powerful machine learning models that yield hierarchies of features used in image processing. As appropriate, pre-processing using domain knowledge may use such convolutional neural networks (CNN) as FCNs as part of its machine learning module to produce a "clean" copy of noisy scanning.

$$f^* = \underset{f}{\operatorname{argmax}} P(f \mid d)$$

MAP-MRF is uniquely used within this context, as opposed to commonly usage of PBMs and graph probes which is not suitable for a large number of tags and complex spatial graphs.

The MRF model currently applied, uses discrete labels and irregularly positioned sites supporting a solution aimed to find the best Matching/Labeling (denoted f) of sites (denoted s) to labels (denoted l), thus providing a tag for each defined site. Additionally, the best f is calculated using an energy function following the Bayes theorem:

$$P(f|d) \propto p(d|f) P(f)$$

Where the Posterior is (f|d), likelihood is p(d|f) and the Prior is P(f). The likelihood and prior can be learnt from existing tagged data, thus the posterior can be calculated The energy function, Prior/site potential: local-data, based on the content and position, Likelihood/Clique potentials: interaction between adjacent sites and labels, Global term: metadata and the Markovianity is defined by:

$$P(f_i | f_{S-\{i\}}) = P(f_i | f_{N_i})$$

Figure 6:
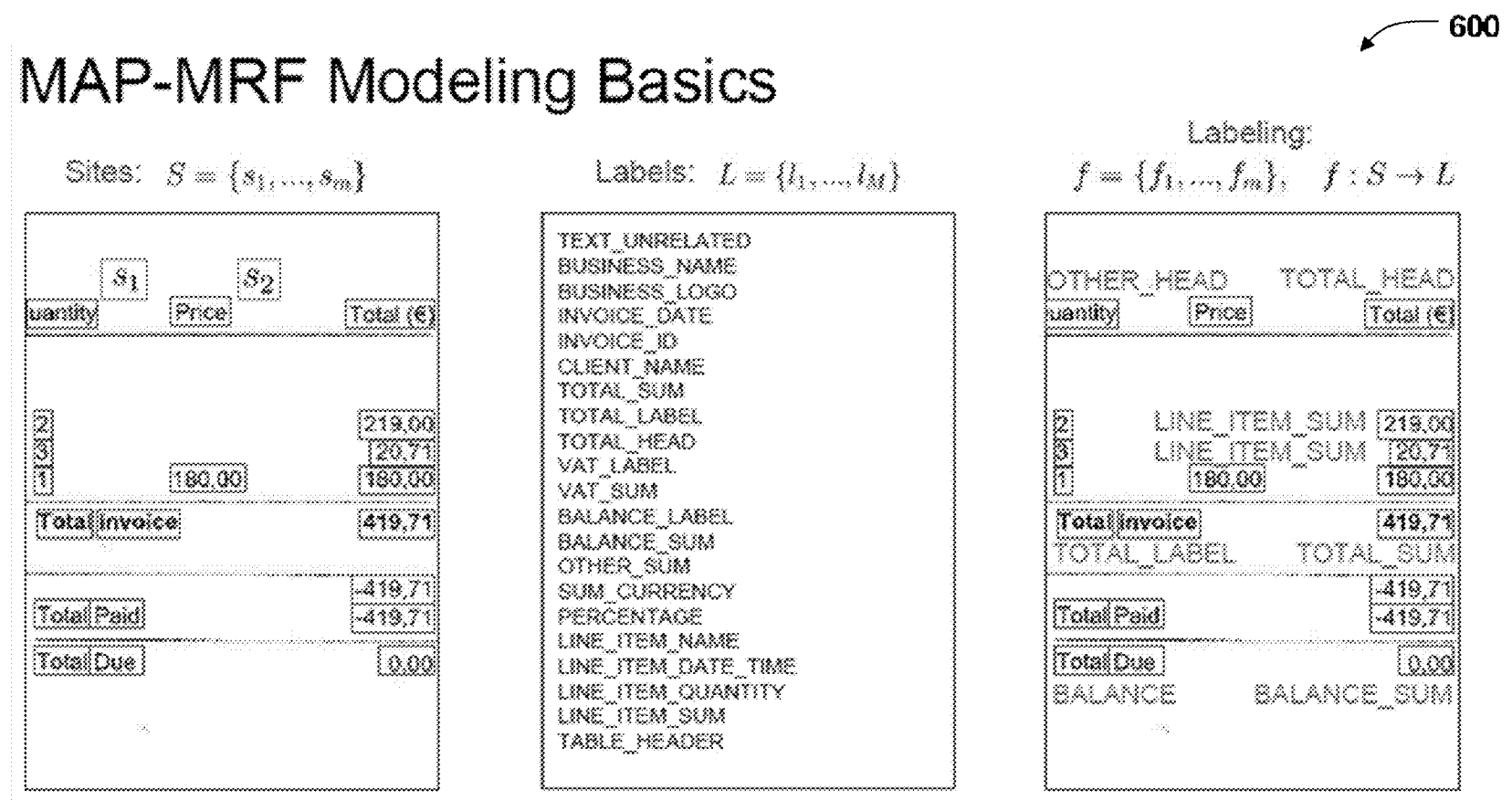

Note, under the Markovianity assumption every site depends only on neighboring sites (denoted N), as is described in FIG. 6. The post-processing module is operable to also construct a graph at the character level and employ a similar probabilistic technique, such as Markovian process, Conditional Random Fields (CRF) and the like. Human tagging may supply pristine segmentation of characters and words, while learning the neighborhood and associated probabilities. Thereafter, a labeling is identified such that the identified labeling is bringing the error to a minimum according to the learned data.

The extraction module 570 is operable to extract information from fields within the business document, identifying a document by comparing the data associated with the business document to a template of a (classified) invoice image in the repository, identifying data fields based on size and position, extracting data from the fields, and applying recognition.

Reference is now made to FIG. 6, there is provided a block diagram representing MAP-MRF modeling basics, which is generally indicated at 600, for tagging associated fields of an invoice image. The MAP-MRF modeling basics 600 includes a set of sites, where $S=\{S_1, \ldots, S_m\}$, a set of preconfigured labels, where $L=\{L_1, \ldots, L_m\}$ and a Labeling output, where: $f=\{f_1, \ldots, f_m\}$, f: S→L.

Figure 7A:
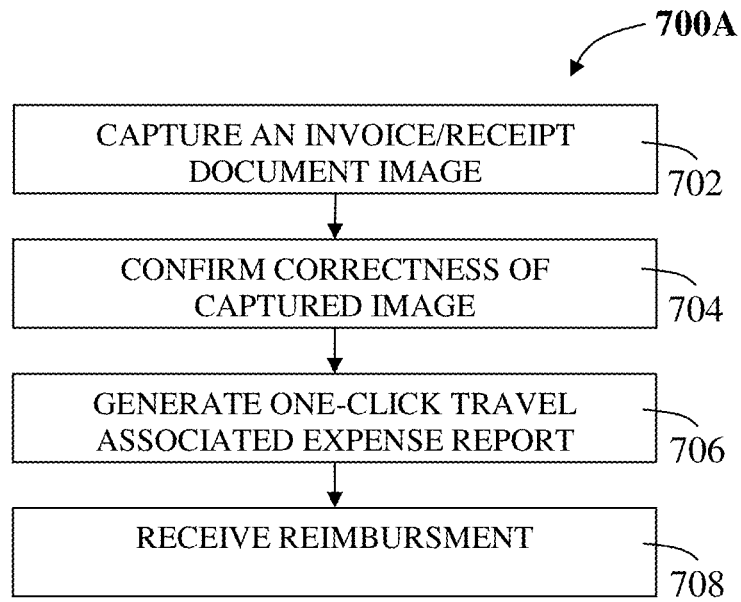
FIG. 7A is a flowchart representing selected actions illustrating a possible method configured for a business traveler usage for managing his/her traveling expenses.

Reference is now made to FIG. 7A, there is provided a flowchart representing selected actions illustrating a possible method configured for a business traveler usage, which is generally indicated at 700A, for managing his/her traveling expenses. The method 700A covers an exemplified business usage of controlling and managing VAT reclaim by a business traveler.

The method 700A may be triggered by a business traveler executing a software application installed on his/her electrical mobile device. The method 700A includes the following steps:

In step 702—capturing at least one business invoice/receipt associated with travel expenses of a business trip, into a document image; optionally, the step comprising an immediate initial analysis of document image, including travel and expense-related fields, such as country of origin, expense type and the like. In step 704—confirming the correctness and validity of the image document reflecting an actual business expense, verifying the expense is properly allocated, thereafter uploading the associated information via the system network. In step 706—generating a one-click travel associated report, representing a set of business expenses, in which the report comprising the relevant data for VAT reclaim stored in a networked data repository. and In step 708—receiving the computed reimbursement of the reclaimed VAT, as information is automatically processed and the amount is transferred to the employee's account, saving a significant amount of administrative.

It is noted that all information and expenses approved by the company are synchronized to the electrical mobile device through network communication and are accessible from different access device (a mobile device, a laptop computer, a PC computer, a tablet and the like), depending upon authorization.

Figure 7B:
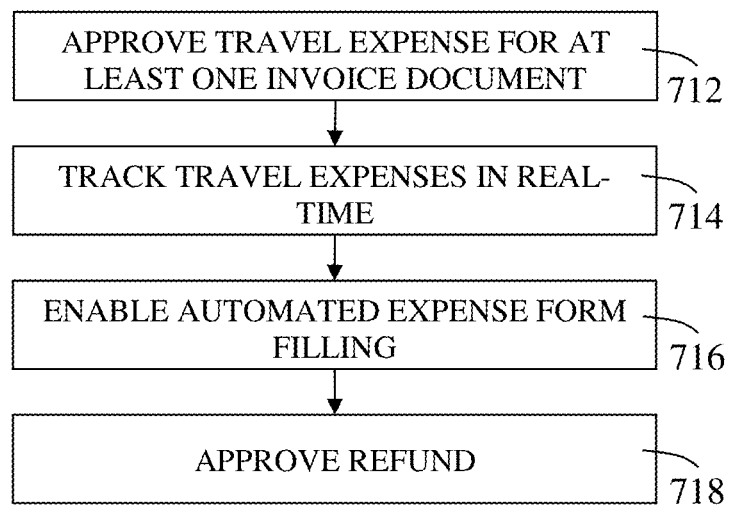
FIG. 7B is a flowchart representing selected actions illustrating a possible method configured for the corporate finance department usage for managing traveling expenses and automated VAT reclaim of at least one business traveler.

Reference is now made to FIG. 7B, there is provided a flowchart representing selected actions illustrating another possible method configured for the corporate finance department usage, which is generally indicated at 700B, for managing traveling expenses. The method 700B covers an exemplified business usage of controlling and managing automated VAT reclaim of at least one business traveler.

The method 700B may be triggered by a corporate finance department person, executing a software application installed on his/her computing device, and includes the following steps:

In step 712—approving travel expenses for at least one business traveler, associated with a known approved business travel. It is noted that all records may be synchronized with the company's information systems, thus providing a global view over the organization expenses. Additionally, the system may provide indication which expenses are approved according to the company's travel and expense regulations; In step 714—tracking business travel expenses in real-time, thus providing instant update when an expense is incurred because all expenses are reported instantly when captured and uploaded via the system's network; In step 716—enabling automated expense form filling, to automatically fill out all countries' foreign VAT reclaim forms and additional documentation, with no extra work for the business traveler; and In step 718—approving refund/reclaimed VAT after review by tax authorities, automated reports may be generated and the company receives a VAT refund directly to its account.

It is noted that the Expense Management System may be integrated with an organization Enterprise Resource Planning (ERP) system, Travel & Expenses (T&E) system (such as SAS and Oracle) and the like, for automated VAT reclaim.

Figure 7C:
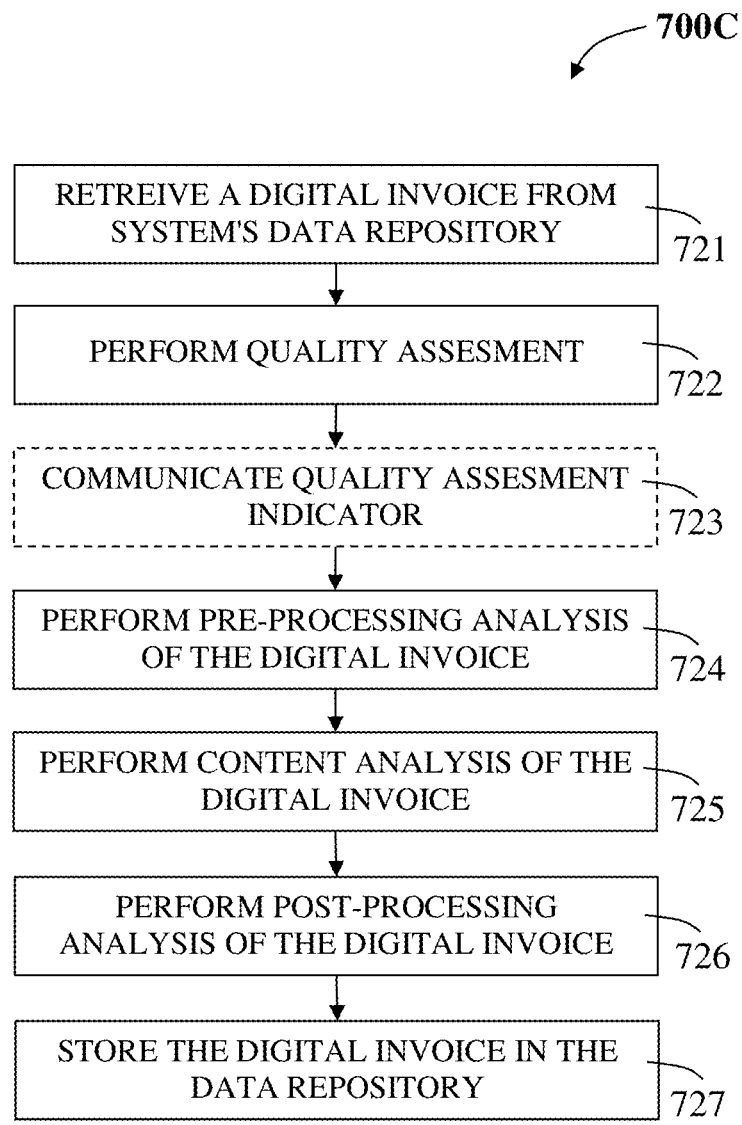
FIG. 7C is a flowchart representing selected actions illustrating a possible method for managing traveling expenses based on invoice images analysis.

Reference is now made to FIG. 7C, there is provided a flowchart representing selected actions illustrating a possible method performing expense management, which is generally indicated at 700C, for managing traveling expenses, based on invoice images analysis. The method 700C covers an exemplified business usage of controlling and managing automated expense management of at least one business traveler. The method 700C includes the following steps:

In step 721—retrieving a business document comprising digital invoice from the system's data repository; In step 722—performing a quality assessment to the retrieved digital invoice, determining its associated assessment indicator; In step 723—optionally, communicating the associated assessment indicator to the requesting business traveler; In step 724—performing pre-processing of the retrieved digital invoice; In step 725—performing content analysis to the retrieved digital invoice; In step 726—performing post-processing of the retrieved digital invoice; and In step 727—storing the retrieved digital invoice into the data repository of the expense management system.

Figure 7D:
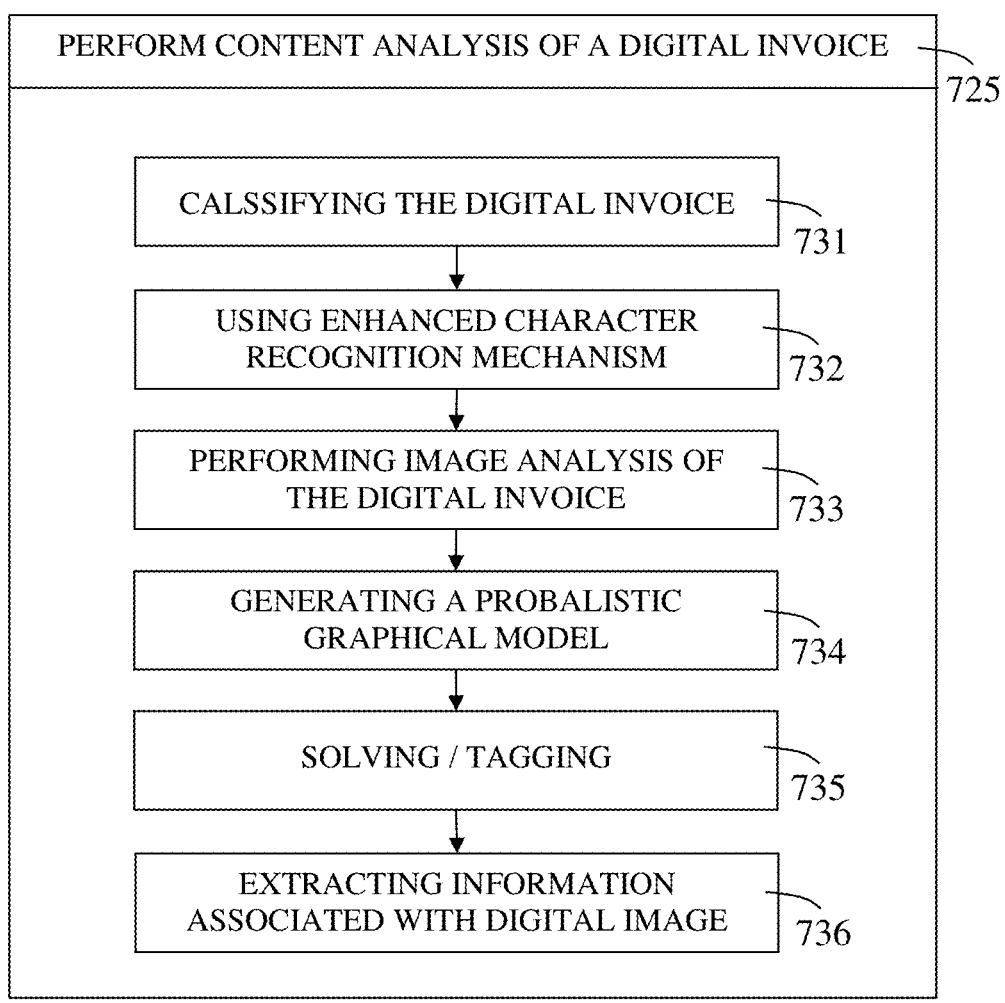
FIG. 7D is a flowchart representing selected actions illustrating a possible method for performing content analysis to the retrieved digital invoice.

Reference is now made to FIG. 7D, there is provided a flowchart representing selected actions illustrating a possible method, which is generally indicated at 700D, for performing content analysis to the retrieved digital invoice. The method 700D covers the actions associated with step 725 (of FIG. 7C). The method 700D includes the following steps:

In step 731—classifying the digital invoice; In step 732—using the enhanced character recognition mechanism; In step 733—performing image analysis of the digital invoice; In step 734—generating a probabilistic graphical model; In step 735—solving/tagging; and In step 736—extracting information associated with the digital invoice.

Figure 7E:
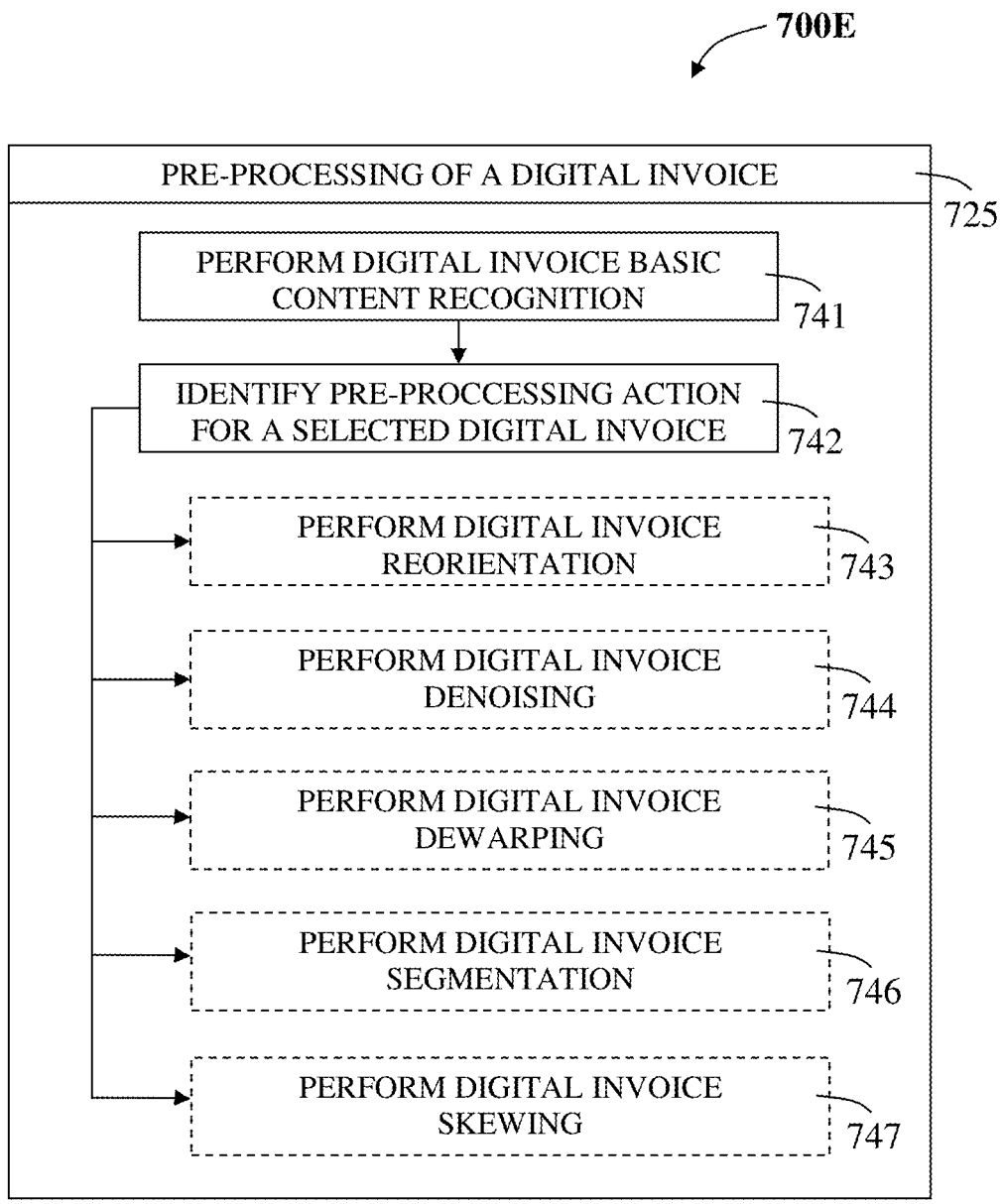
FIG. 7E is a flowchart representing selected actions illustrating a possible method for pre-processing of the retrieved digital invoice.

Reference is now made to FIG. 7E, there is provided a flowchart representing selected actions illustrating a possible method, which is generally indicated at 700E, for pre-processing of the retrieved digital invoice. The method 700E covers the actions associated with step 724 (of FIG. 7C). The method 700E includes the following steps:

In step 741—performing basic content recognition on a business document comprising at least one digital invoice; In step 742—identifying a pre-processing action required for the business document comprising at least one digital invoice; In step 743—performing pre-processing action of reorientation on the graphic image associated with the digital invoice; In step 744—performing pre-processing action of de-noising on the graphic image associated with the digital invoice; In step 745—performing pre-processing action of de-warping on the graphic image associated with the digital invoice; In step 746—performing pre-processing action of segmentation on the graphic image associated with the digital invoice; and In step 747—performing pre-processing action of skewing on the graphic image associated with the digital invoice.

Figure 7F:
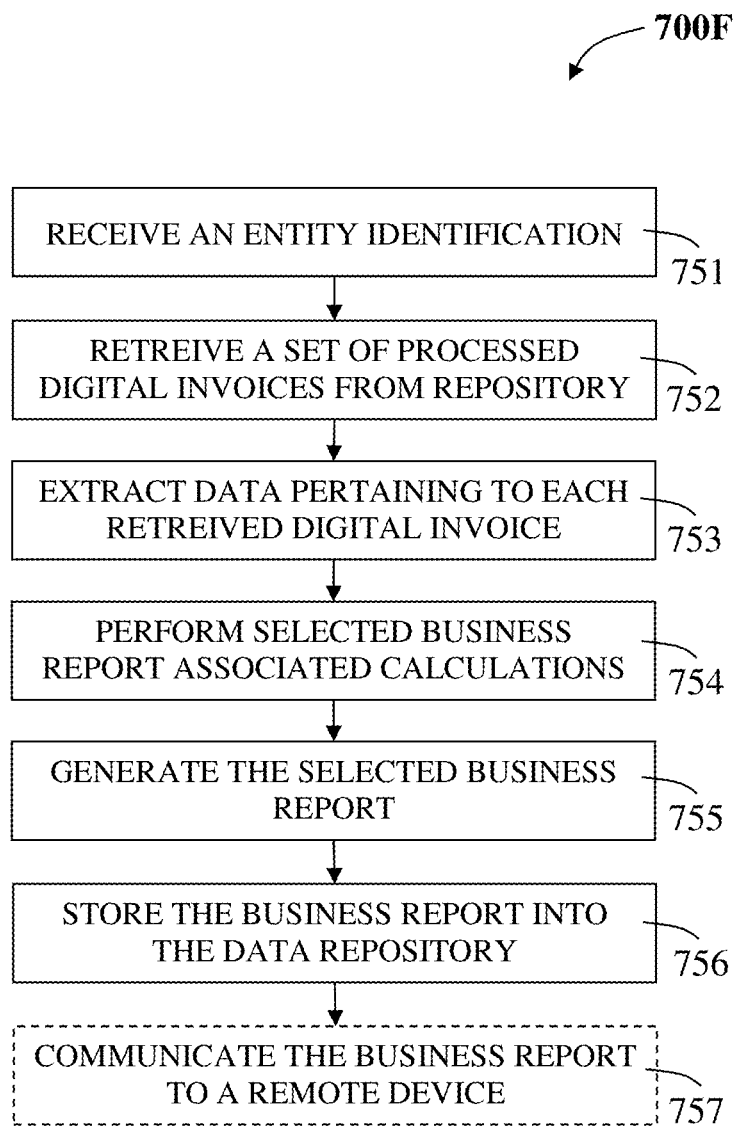
FIG. 7F is a flowchart representing selected actions illustrating a possible method for generating selected business report.

Reference is now made to FIG. 7F, there is provided a flowchart representing selected actions illustrating a possible method, which is generally indicated at 700F, for generating selected business report from a set of digital invoices. The method 700F includes the following steps:

In step 751—receiving an entity identification; In step 752—receiving a set of processed digital invoices from repository; In step 753—extracting data pertaining to each retrieved digital invoice; In step 754—performing selected business report associated calculations; In step 755—generating the selected business report; In step 756—storing the business report into the data repository; and In step 757—communicating the business report to a remote device.

Figure 8:
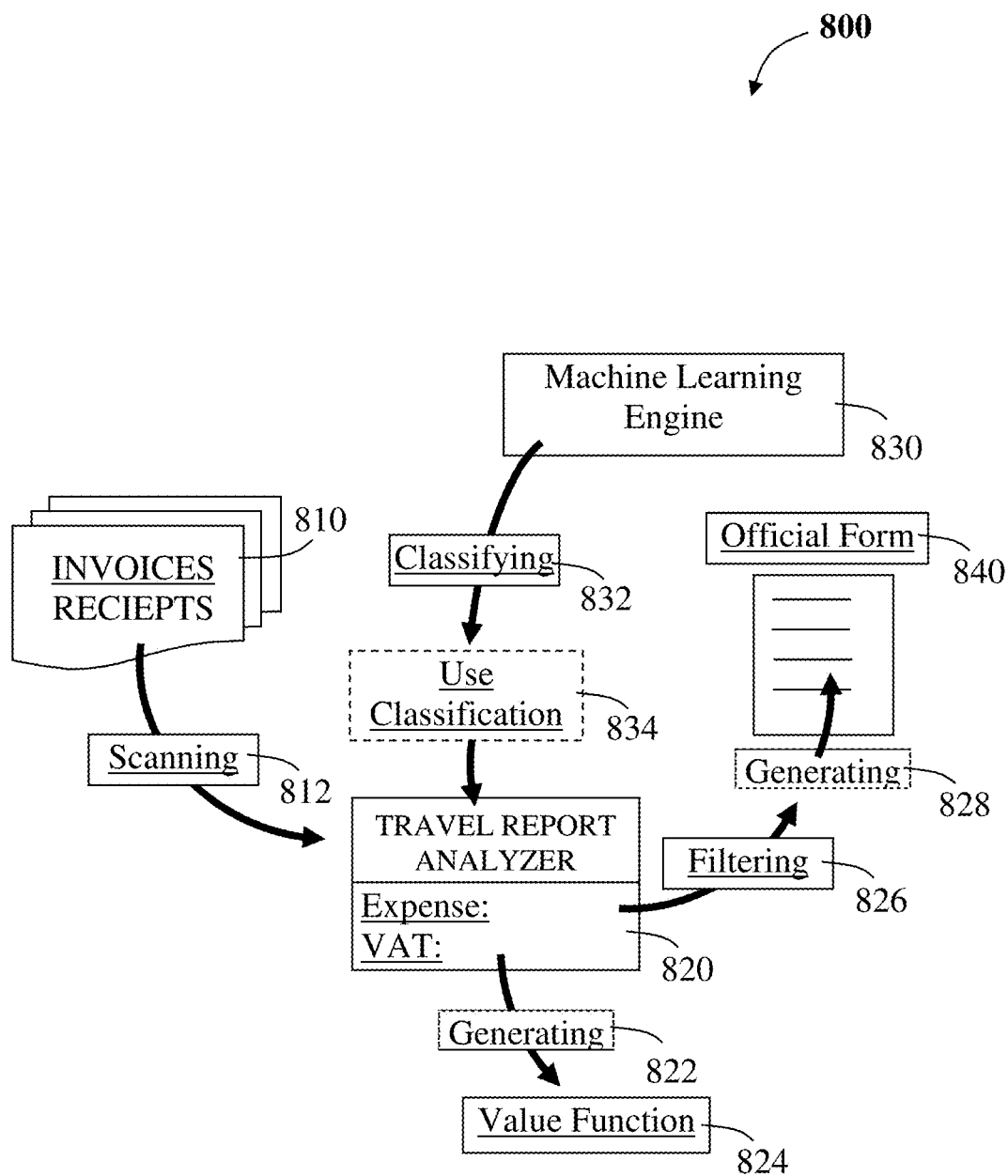
FIG. 8 is a flowchart representing selected actions illustrating a possible method for performing invoice content analysis.

Reference is now made to FIG. 8, there is provided a flowchart representing another flow of actions illustrating a possible method, which is generally indicated at 800, for performing invoice content analysis. The method 800 includes, where appropriate, performing invoice scanning (step 812) and uploaded through a communication network to the invoice expense management system; generating (step 814), for each invoice image, a report detailing the various fields and associated values and further providing the total expense and the relevant VAT amount. The system is configurable for classifying (step 832) each invoice image for analysis purposes, based upon machine learning engine 830 and associated knowledge repository (not shown), and further read the classification knowledge repository to resolve the fields' context accordingly while updating the learning module, where appropriate.

The system is further configurable of generating (step 828), manually or automatically, the various official forms (system configurable) required, such as VAT refund submission forms and the like, optionally filtering (step 826), where applicable.

Optionally, the system is configurable of generating (step 822) value functions associated with a particular invoice image, a set of invoices from a specific service provider, a set of invoices associated with a time duration, a destination and more.

Figure 9:
FIG. 9 is a set of invoice images where each image is representing a different invoice classification.
Figure 9:
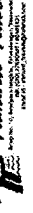
Figure 9:
Figure 9:

Reference is now made to FIG. 9, there is provided a sample of various classifications of invoice images Class-1, Class-2 to Class-N, each representing a different class, which is generally indicated at 900, for classifying pending invoice images.

Image classification is an important technique applied to images for digital image processing. Classification methods, within the scope of the current disclosure, may be implemented to classify the invoice content into a limited number of major invoice classes.

Optionally, the invoice content may be classified into a hierarchy of minor invoice classes.

The results of such classification may be used to spatially direct the efforts of subsequent digital operations or detailed visual interpretation, or to direct ground data collection efforts as part of building data knowledge learning.

It is noted that the classification repository may change continuously, and new classes may be determined suitable to enter the classification repository.

Figure 10A:
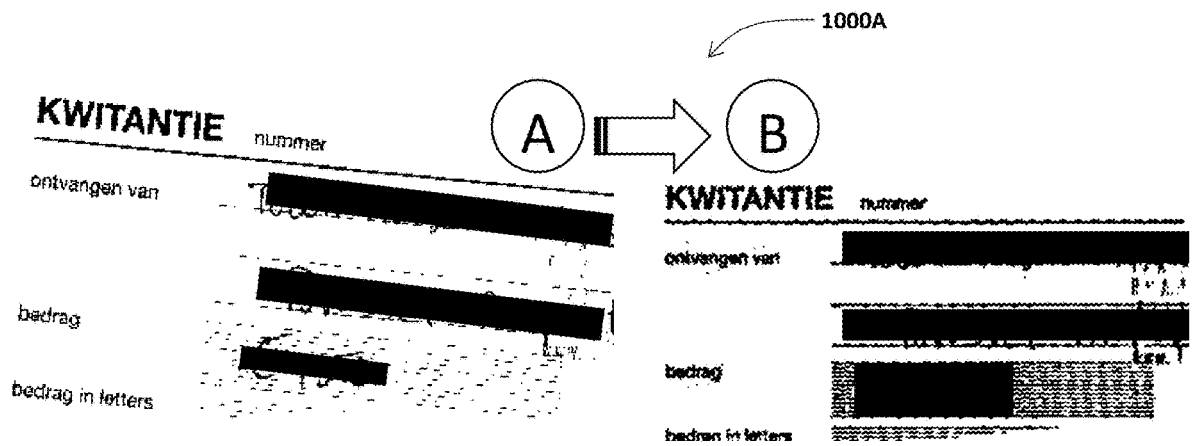
FIG. 10A represents a de-skewing exemplified view of two sample invoice images.

Reference is now made to FIG. 10A, there is provided a de-skewing exemplified view of two sample invoice images, which is generally indicated at 1000A, for performing a de-skew operation on an image, using image processing techniques. De-skew may be implemented in the way of minimizing the axis-aligned bounding box of the relevant content. Testing multiple hypotheses of skew angles and taking the one that minimizes the bounding box produces a de-skewed image. Further, finding the best angle can be performed by means of a voting scheme such as a Hough Transform, where lines detected in the image support a central hypothesis of the image skew.

Image A is presented as a skewed image, while B is presented as an invoice image after executing a de-skew action of the skewed invoice image.

Figure 10B:
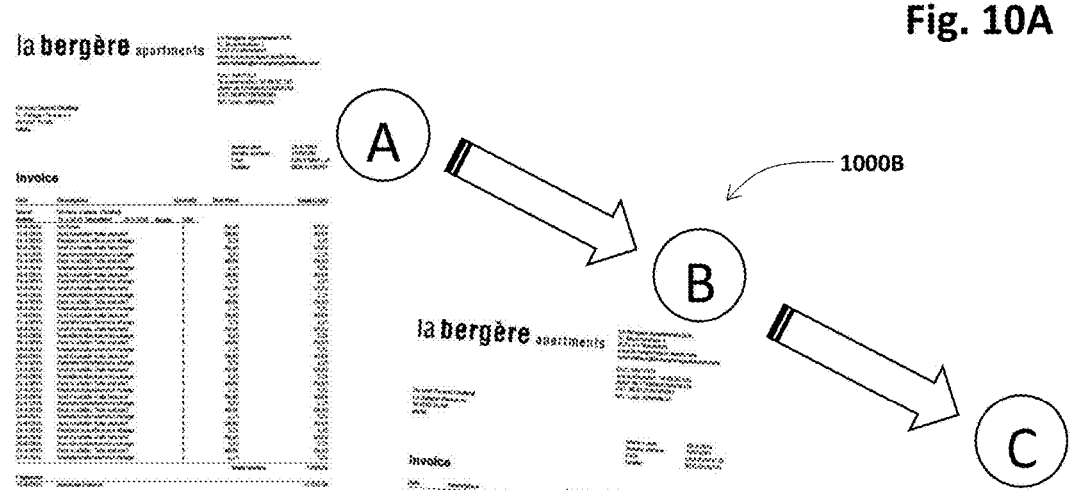
FIG. 10B represents a de-skewing exemplified testing mechanism applied to an invoice image.

Reference is now made to FIG. 10B, there is provided a de-skewing exemplified testing mechanism applied to an invoice image, which is generally indicated at 1000B, for testing the correctness of the de-skewing mechanism on a known aligned image.

The invoice image A represents an aligned invoice image; invoice image B is presented after applying a random skew to the first invoice image (A) and the invoice image C represents the invoice image after de-skewing operation, and the resulting de-skewed image is compared to the aligned invoice image A, prior to applying the random skew.

It is noted that the aligned invoice image A and de-skewed invoice C represent the same invoice image undergone de-skewing action.

Figure 11A:
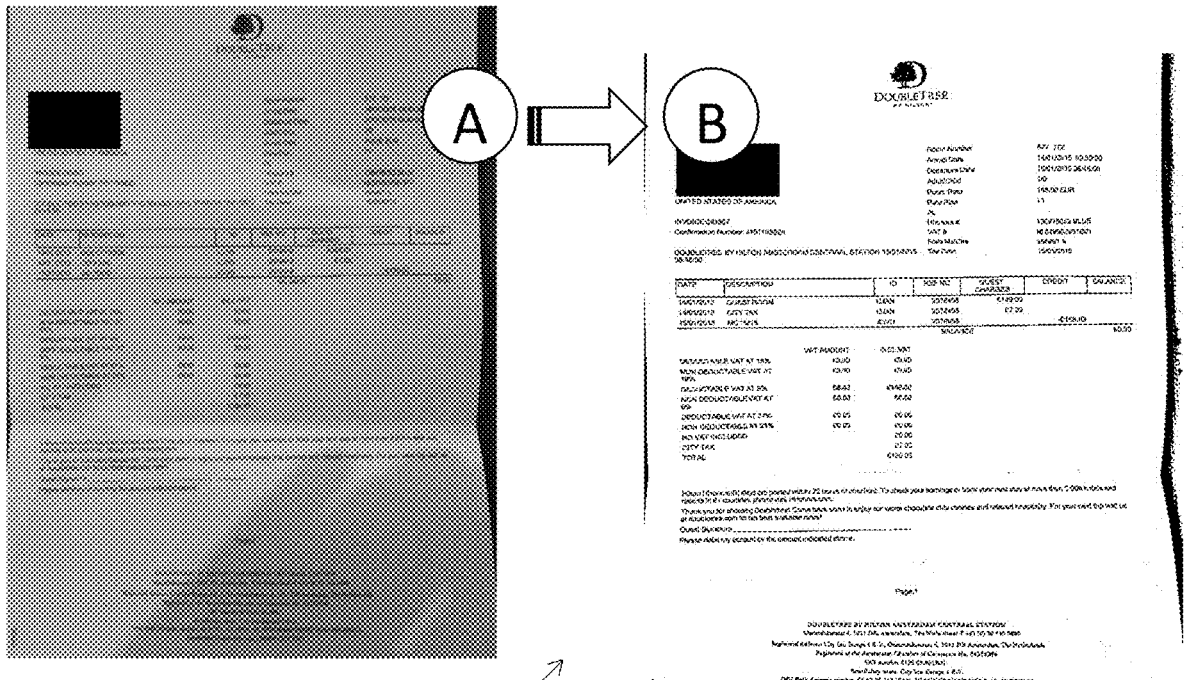
FIGS. 11A-B provide illustrations of an exemplified adaptive threshholding (binarization) mechanism for improving an invoice image readability.

Reference is now made to FIG. 11A, there is provided an exemplified adaptive thresholding (binarization) mechanism, which is generally indicated at 1100A, for improving an invoice image readability.

Thresholding is the simplest way to segment objects from a noisy background. Using adaptive document image binarization, where the page is considered as a collection of subcomponents such as text, background and picture. The problems caused by noise, illumination and many source type related degradations are addressed. The algorithm uses document characteristics to determine (surface) attributes, often used in document segmentation. If that background is relatively uniform, then one can use a global threshold value to binarize the image by pixel-intensity. If there's large variation in the background intensity, however, adaptive thresh-holding (known also as local or dynamic thresholding) may produce better results.

Segmentation may also be performed in the manner of textural analysis of the invoice document. A regular grid graph over the image may be used to describe a textural relationship between neighboring regular image patches (N-by-N pixels blocks). Textural analysis of each patch can determine if the patch contains text or background, for example using a text-detection method such as Stroke Width Transform (SWT) or a similar edge-based statistical method. Statistical features from co-occurrence analysis (for example the gray-level co-occurrence matrix—GLCM) such as Energy, Entropy and standard deviation, can efficiently describe image textures. Further, a graph-cut optimization algorithm can define a segmentation over the aforementioned regular grid of patches and divide the image to coherent areas where text is prevalent and areas of background. The areas can then inform the process of single or multiple invoice extraction. It is noted that the invoice image A is presented prior to binarization, and the image B is presented after binarization.

Figure 11B:
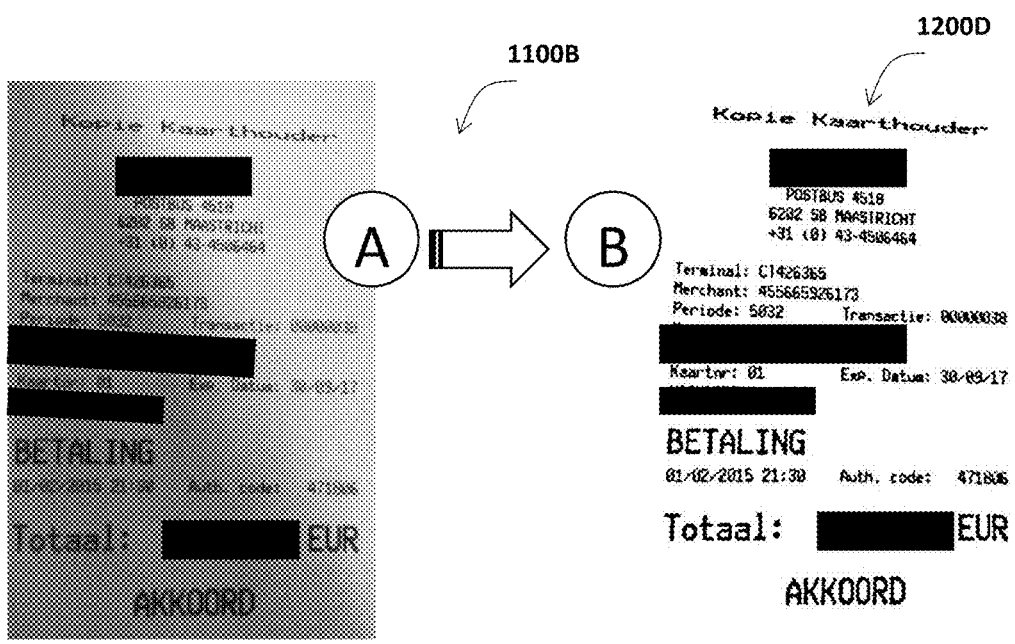

FIG. 11B represents another sample of a binarization providing a clear and improved invoice image. Reference is now made to FIG. 11B, there is provided another exemplified adaptive thresh-holding (binarization) mechanism, which is generally indicated at 1100B, for improving an invoice image readability. It is noted that the invoice image A is presented prior to binarization, and the image B is presented after binarization.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%. The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims. Additionally, the various embodiments set forth hereinabove are described in terms of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting. The scope of the disclosed subject matter is defined by the appended claims and includes both combinations and sub combinations of the various features described hereinabove as well as variations and modifications thereof, which would occur to persons skilled in the art upon reading the foregoing description.

What is claimed is:

1. A method for performing digital invoice content analysis in an improved manner, said method comprising the steps of:
providing an expense management system operable to execute on at least one computing device, said system comprising an invoice content analyzer, an invoice content generator comprising a classifier, a machine learning engine, a communication interface and a tagging mechanism;
receiving, via said communication interface, at least one digital source comprising at least one digital invoice;
pre-processing, by said invoice content analyzer, said at least one digital invoice;
providing, by said tagging mechanism, at least one textual tag associated with a an invoice entity at a location in said at least one digital invoice;
analyzing, by said invoice content analyzer, said at least one digital invoice;
producing, by said invoice content analyzer, at least one analysis result;
generating, by said invoice content analyzer, at least one business report comprising said at least one analysis result; and
communicating, by said communication interface, said at least one business report.

2. The method of claim 1, wherein the step of receiving further comprises pre-processing, by said invoice content analyzer, said at least one digital invoice.

3. The method of claim 1, wherein the step of receiving further comprises:
analyzing, by said invoice content analyzer, quality of said at least one digital invoice;
generating, by said invoice content analyzer, at least one quality assessment of said at least one digital invoice; and
communicating, by said communication interface, at least one technical response comprising said at least one quality assessment.

4. The method of claim 3, wherein said at least one quality assessment is a numeric representation assigned, indicating the technical ability of said expense management system to extract associated information from said at least one digital invoice.

5. The method of claim 1, wherein the invoice content generator further comprises an optical character recognition (OCR) engine, and wherein the step of pre-processing further comprising generating, by said OCR engine, a textual representation of said at least one digital invoice.

6. The method of claim 1, further comprising the invoice content analyzer directing operation of the invoice content generator and the machine learning engine.

* * * * *